(12) United States Patent
Soundararajan et al.

(10) Patent No.: US 12,632,389 B2
(45) Date of Patent: May 19, 2026

(54) SELECTIVE PROVISIONING OF SUPPLEMENTARY MICRO-OPERATION CACHE RESOURCES

(71) Applicant: Intel Corporation, Santa Clara, CA (US)

(72) Inventors: Niranjan Soundararajan, Bengaluru (IN); Sreenivas Subramoney, Bangalore (IN); Vishal Gupta, Kanpur (IN); Neelu Shivprakash Kalani, Vaud (CH)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/846,688

(22) Filed: Jun. 22, 2022

(65) Prior Publication Data

US 2023/0418757 A1      Dec. 28, 2023

(51) Int. Cl.
| | |
|---|---|
| *G06F 12/0891* | (2016.01) |
| *G06F 9/30* | (2018.01) |
| *G06F 12/0831* | (2016.01) |
| *G06F 12/0871* | (2016.01) |

(52) U.S. Cl.
CPC ...... *G06F 12/0891* (2013.01); *G06F 9/30047* (2013.01); *G06F 9/30145* (2013.01); *G06F 12/0833* (2013.01); *G06F 12/0871* (2013.01)

(58) Field of Classification Search
CPC ............. G06F 12/0811; G06F 12/0833; G06F 12/0871; G06F 12/0875; G06F 12/0891;
G06F 2212/452; G06F 2212/502; G06F 2212/601; G06F 9/30047; G06F 9/30076;
(Continued)

(56) References Cited

U.S. PATENT DOCUMENTS

| | | | |
|---|---|---|---|
| 10,324,726 B1 * | 6/2019 | Geary | G06F 12/0875 |
| 2019/0370082 A1 * | 12/2019 | Patgar | G06F 9/5088 |
| 2021/0042122 A1 * | 2/2021 | Ma | G06F 9/3851 |

(Continued)

OTHER PUBLICATIONS

Kanev, Svilen, et al., "Profiling a Warehouse-Scale Computer", Proceedings of the 42nd Annual International Symposium on Computer Architecture, 2015, 6 pgs.
(Continued)

*Primary Examiner* — Hashem Farrokh
(74) *Attorney, Agent, or Firm* — Essential Patents Group, LLP

(57) ABSTRACT

Techniques and mechanisms for selectively increasing or decreasing an amount of cache resources which are to be available for use in the provisioning of decoded micro-operations in a processor. In an embodiment, a processor core comprises both a first cache which is dedicated to caching micro-operations, and a second cache which is coupled to receive data, or non-decoded instructions. The core further comprises circuitry to monitor one or more cache performance characteristics of the core. Based on the one or more cache performance characteristics, the circuitry performs an evaluation to determine whether to increase—or alternatively, to decrease—the size of a pool of one or more caches which are to be available to receive micro-operations. In another embodiment, the second cache is added to the pool based on an indication of an overutilization of the first cache.

14 Claims, 13 Drawing Sheets

(58) Field of Classification Search
  CPC ............. G06F 9/30145; G06F 9/30185; G06F
                                                  9/30189
  USPC ........................................................ 711/180
  See application file for complete search history.

(56)                        References Cited

U.S. PATENT DOCUMENTS

2022/0100516 A1*   3/2022  Madaelil ............... G06F 9/3016
2022/0107810 A1*   4/2022  Dutta ................... G06F 9/3808

OTHER PUBLICATIONS

Kotra, Jagadish B., et al., "Improving the Utilization of Micro-operation Caches in x86 Processors", 2020 53rd Annual IEEE/ACM International Symposium on Microarchitecture (MICRO), 13 Pgs.

* cited by examiner

200

210

Monitor a performance of multiple caches comprising a first (micro-ops) cache and a second cache, wherein the second cache is coupled to receive data, or to receive instructions to be provided to a instruction decoder

212

Detect, based on the performance, an instance of a first cache utilization condition wherein a first utilization metric is above a threshold level

214

Based on the first cache utilization condition, add the second cache to a pool of one or more caches which are to be available to receive micro-operations

216

Store a first one or more micro-operations to the second cache

218

Detect an instance of a second cache utilization condition wherein a second utilization metric is below a second threshold level

220

Based on the second cache utilization condition, remove the second cache from the pool

FIG. 2

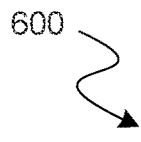

600

```
                                                    ┌─ 610
                          ┌─────────────────────────────┐
                          │ Determining one or more cache│
                          │ pool performance metrics based│◄──────┐
                          │     on MMT information        │       │
                          └─────────────────────────────┘        │
                                       │                          │
                                       ▼                          │
                                    ┌─ 612                        │
                   NO          ◄    Is cache pool                 │
                   ◄───────────     hit rate > micro-op           │
                   │                cache hit rate?               │
                   │                     │                        │
                   │                    YES                       │
                   │                     ▼                        │
                   │                  ┌─ 614                      │
                   │         ┌─────────────────────────────┐      │
                   │         │ Enable supplemental cache    │      │
                   │         │ mode, if currently disabled  │      │
                   │         └─────────────────────────────┘      │
                   │                     │                        │
                   │                     ▼                        │
                   │                  ┌─ 616                      │
                   │         ┌─────────────────────────────┐      │
                   │         │ Determine supplemental cache │      │
                   │         │    performance metrics       │      │
                   │         └─────────────────────────────┘      │
                   │                     │                        │
                   │                     ▼                        │
                   │                  ┌─ 618                      │
                   │              Increased          NO           │
                   │           supplemental cache  ───────────────┘
                   │              miss rate?
                   │                     │
                   │                    YES
                   │                     ▼
                   │                  ┌─ 620
                   │         ┌─────────────────────────────┐
                   └────────►│ Disable supplemental cache   │
                             │ mode, if currently enabled   │
                             └─────────────────────────────┘
```

Determining one or more cache pool performance metrics based on MMT information — 610

Is cache pool hit rate > micro-op cache hit rate? — 612

NO

YES

Enable supplemental cache mode, if currently disabled — 614

Determine supplemental cache performance metrics — 616

Increased supplemental cache miss rate? — 618

NO

YES

Disable supplemental cache mode, if currently enabled — 620

Decode instruction while supplemental cache(s) enabled

712

Extended instruction?

NO

YES

716

Supplementary caching bit set?

YES

NO

718

Eliminate supplemental cache(s) as candidate(s)

720

Caching criteria met?

NO

YES

722

Cache the micro-operation(s) to a candidate cache of the cache pool

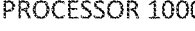
PROCESSOR 1000
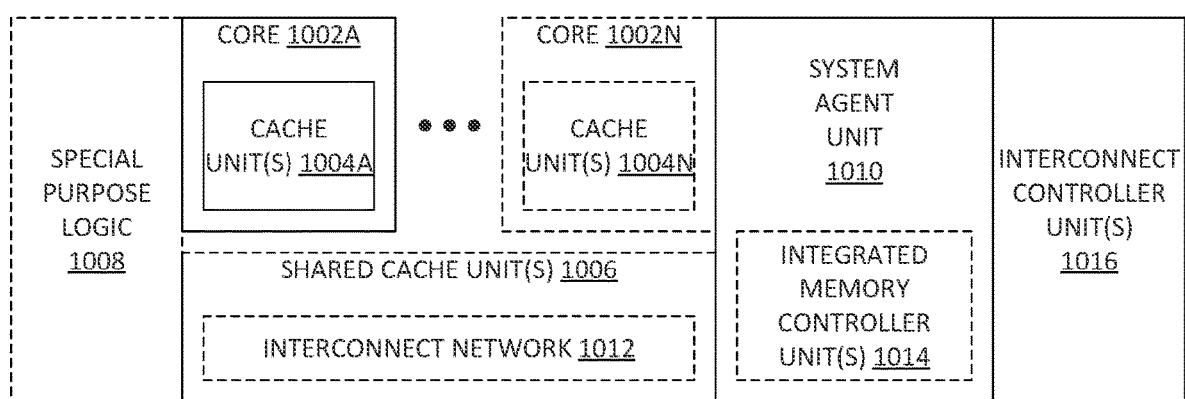
FIG. 10

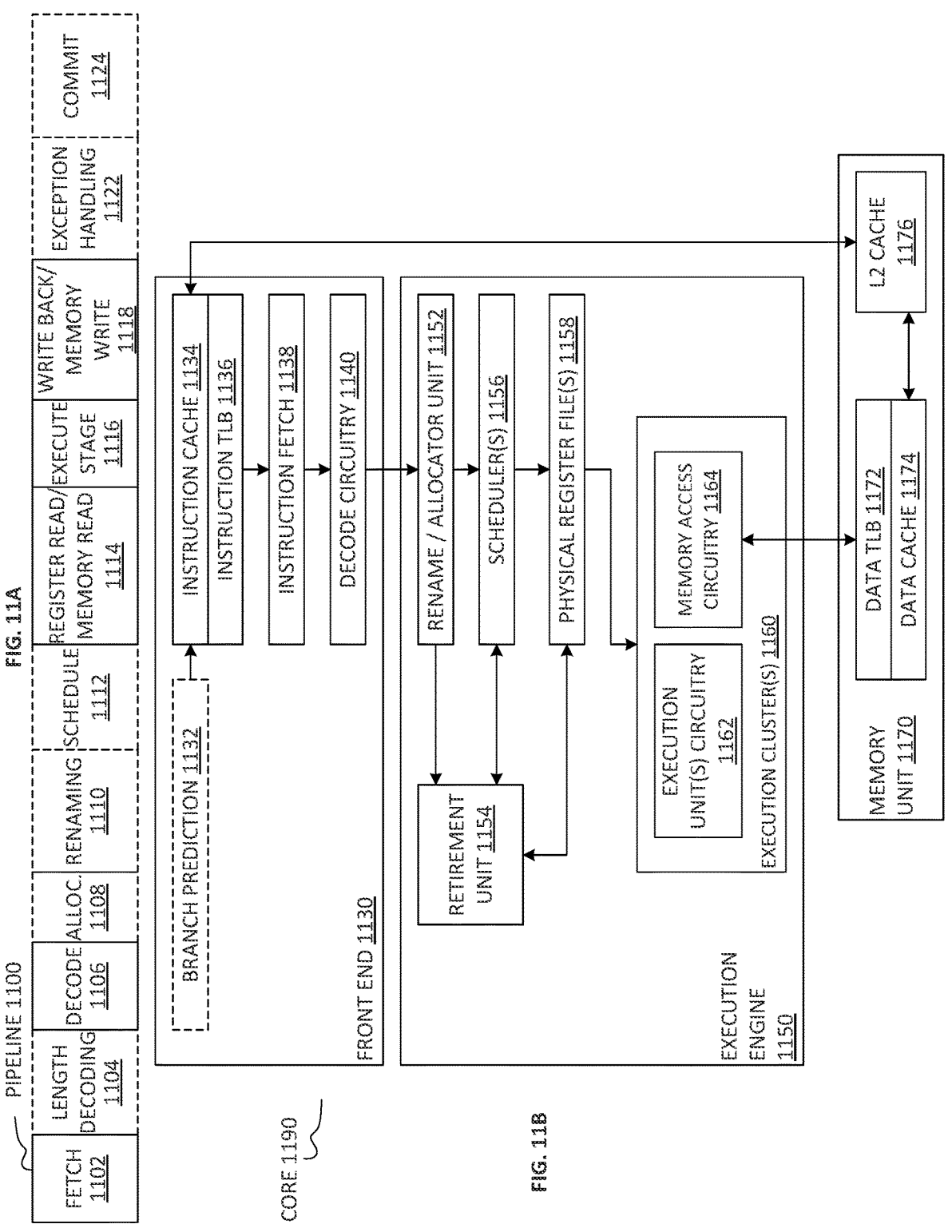

FIG. 11A

PIPELINE 1100

| FETCH 1102 | LENGTH DECODING 1104 | DECODE 1106 | ALLOC. 1108 | RENAMING 1110 | SCHEDULE 1112 | REGISTER READ/ MEMORY READ 1114 | EXECUTE STAGE 1116 | WRITE BACK/ MEMORY WRITE 1118 | EXCEPTION HANDLING 1122 | COMMIT 1124 |

CORE 1190

FIG. 11B

BRANCH PREDICTION 1132

INSTRUCTION CACHE 1134

INSTRUCTION TLB 1136

INSTRUCTION FETCH 1138

DECODE CIRCUITRY 1140

FRONT END 1130

RENAME / ALLOCATOR UNIT 1152

SCHEDULER(S) 1156

PHYSICAL REGISTER FILE(S) 1158

RETIREMENT UNIT 1154

EXECUTION UNIT(S) CIRCUITRY 1162

MEMORY ACCESS CIRCUITRY 1164

EXECUTION CLUSTER(S) 1160

EXECUTION ENGINE 1150

L2 CACHE 1176

DATA TLB 1172

DATA CACHE 1174

MEMORY UNIT 1170

SELECTIVE PROVISIONING OF SUPPLEMENTARY MICRO-OPERATION CACHE RESOURCES

BACKGROUND

1. Technical Field

This disclosure generally relates to microprocessors and more particularly, but not exclusively, to allocating a cache resource to receive one or more micro-operations from an instruction decoder.

2. Background Art

In some modern processors, instructions have variable lengths and form a complex instruction set capable of complex tasks that may involve multiple simpler tasks, thus the term complex instruction set computers (CISC). Micro-operations (also known as a "micro-ops," or "µops"), are simpler internal instructions that can be produced by decoding the more complex instructions, which are also referred to as macroinstructions.

Processors typically use some sort of execution pipeline, wherein instructions are provided to a front end of the pipeline by various arrays, buffers, and caches and micro-ops are prepared and queued for execution.

For high performance processors that use these variable length instructions, the decoding process can be costly in terms of circuitry, power consumption and time. Some processors try to alleviate one or more of these costs through saving or caching the decoded micro-ops to reuse them if execution of their corresponding macroinstructions is repeated.

One technique is called a micro-op cache or microcode cache, where micro-ops are stored in cache lines (or ways) and tags associated with instruction pointers are used to lookup the micro-ops directly rather than decoding the corresponding macro-instruction each time. Micro-op caches may be less costly and more power efficient than fetching and decoding macro-instructions.

As successive generations of processor architectures continue to increase in number, variety, and capability, there is expected to be an increasing premium placed on improvements to how micro-operations are efficiently provided to execution resources of a processor.

BRIEF DESCRIPTION OF THE DRAWINGS

The various embodiments of the present invention are illustrated by way of example, and not by way of limitation, in the figures of the accompanying drawings and in which:

FIG. 2 shows a flow diagram illustrating features of a method to cache one or more micro-operations of a decoded instruction according to an embodiment.

FIGS. 6 through 8 show flow diagrams each illustrating features of a respective method to operate caches of a processor according to a corresponding embodiment.

FIG. 10 illustrates a block diagram of an example processor that may have more than one core and an integrated memory controller.

FIG. 11A is a block diagram illustrating both an exemplary in-order pipeline and an exemplary register renaming, out-of-order issue/execution pipeline according to examples.

FIG. 11B is a block diagram illustrating both an exemplary example of an in-order architecture core and an exemplary register renaming, out-of-order issue/execution architecture core to be included in a processor according to examples.

DETAILED DESCRIPTION

Figure 1:
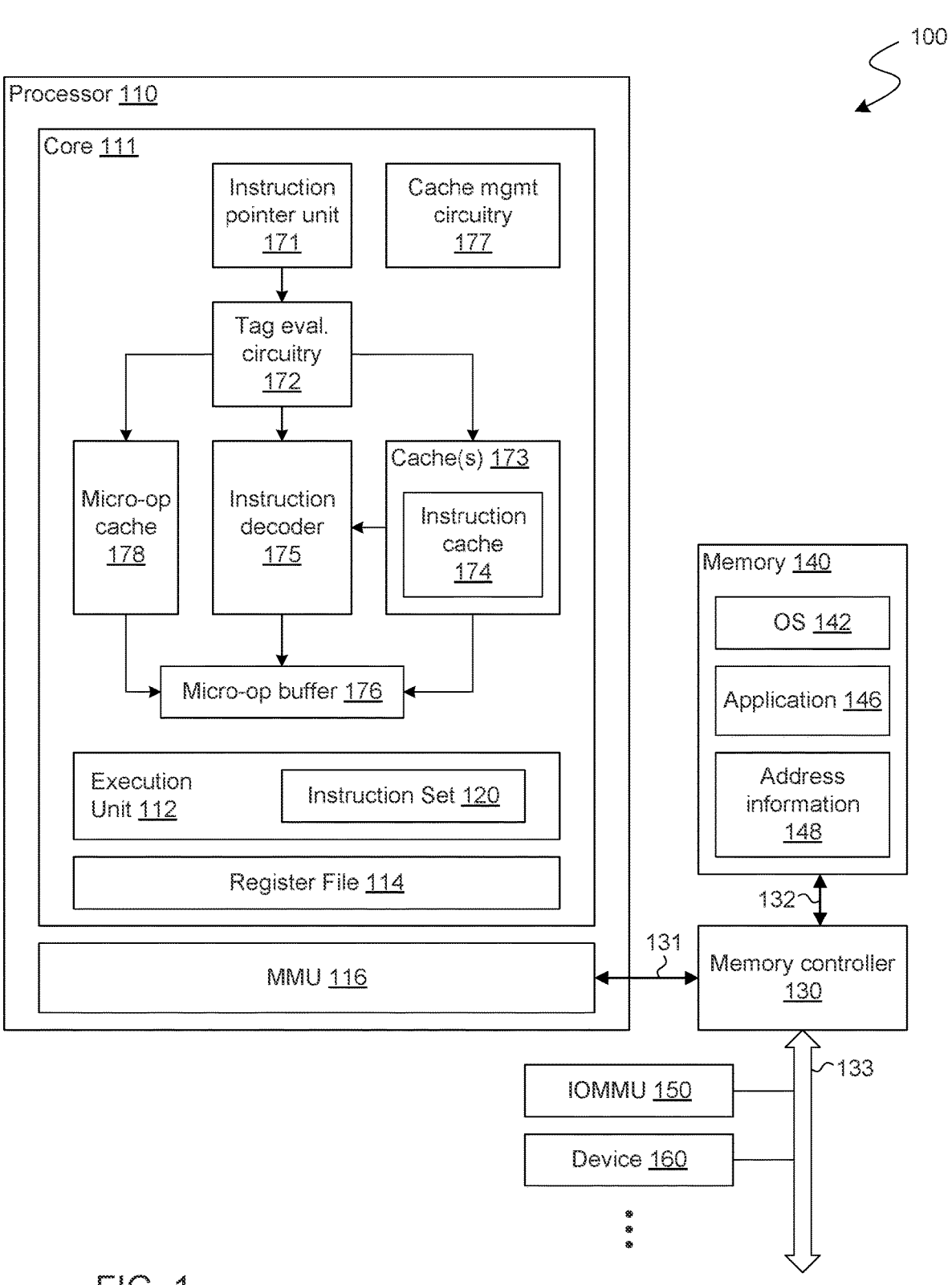
FIG. 1 shows a functional block diagram illustrating features of a system to determine a location to cache information according to an embodiment.

Embodiments discussed herein variously provide techniques and mechanisms for selectively increasing or decreasing an amount of cache resources which are to be available for use in the provisioning of decoded micro-operations. There is a general trend in semiconductor technologies wherein successive generations of processor architectures have execution pipelines which are larger in width and/or larger in depth. One challenge to this trend is that such larger execution pipelines tend to be increasingly sensitive to front end (FE) stalls. To help avoid or otherwise mitigate the effects of such stalls, various types of processors include a micro-op cache (also referred to as a decode stream buffer, or "DSB") which stores previously decoded micro-operations for potential reuse by an execution pipeline. Such micro-op caches play a significant role in lowering front end latencies by quickly feeding a cached version of previously decoded micro-operations to a processor backend.

Over successive generations of processor designs, micro-op caches have tended to grow in size—e.g., to accommodate increasing sizes of micro-operations, and the increasing input bandwidths of execution engines that receive and process said micro-operations. However, due to various timing, power, and area limitations, it is increasingly difficult to continue such growth in the size of micro-op caches.

Some embodiments improve on the provisioning of previously decoded micro-operations by providing processor circuitry which is operable to opportunistically (and, for example, transparently) store at least one or more micro-operations in an additional cache of the processor—e.g., in a cache other than one which is dedicated to storing such micro-operations. In various embodiments, another cache of a processor (e.g., a cache of the core which includes the micro-operation cache in question) is coupled to receive information other than any previously decoded micro-operations. For example, this other cache is to receive data, or (alternatively) is to receive instructions which have yet to be decoded by an instruction decoder.

In one such embodiment, cache management circuitry is operable to selectively make this other cache available under some conditions (and, for example, unavailable under alternative conditions) as a supplementary cache for the provisioning of micro-operations. In this particular context, "supplementary"—e.g., in the term "supplementary cache"—refers herein to the characteristic of a cache, which caches information other than micro-operations, being made available to also supplement a micro-operation cache as an additional resource for caching micro-operations.

In some embodiments, a cache which is to be conditionally made available as a supplementary cache is one of an instruction cache or a data cache. In one such embodiment, a supplementary cache is one of multiple caches in a cache hierarchy—e.g., wherein the supplementary cache is one of a level 1 (L1) cache, a level 2 (L2) cache, a last level cache (LLC) or the like. By opportunistically caching decoded micro-operations in a supplementary cache, some embodiments dynamically improve the efficiency of micro-op communication and execution, which in turn boosts performance and energy efficiency (e.g., by avoiding repeated decoding operations).

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which supports supplementary micro-operation cache functionality.

FIG. 1 is a block diagram illustrating a system 100 that conditionally makes more (or fewer) resources available to cache micro-operations according to one embodiment. System 100 is one example of an embodiment wherein one or more caches of a processor are selectively added to, or removed from, a pool of one or more caches which are available to cache micro-operations that have been generated by the decoding of an instruction. Such a pool of one or more caches is referred to herein as a "cache pool" (or, for brevity, simply as a "pool"). In some embodiments, such a cache pool includes at least a micro-operation cache—i.e., a cache which is dedicated to caching micro-operations. At various times during operation of system 100, one or more other processor caches are added to (or removed from) such a cache pool—e.g., wherein the one or more other processor caches are each to further store respective information other than any micro-operations.

System 100 includes, or supports operation in, any of various computing devices including handheld devices and devices for embedded (or other) applications. For example, system 100 provides or is to operate as a component of any of various devices including, but not limited to, a desktop computer, a tablet computer, a laptop computer, a netbook, a notebook computer, a personal digital assistant (PDA), a server, a workstation, a cellular telephone, a mobile computing device, a smart phone, an Internet Protocol device, a digital camera or the like. In some embodiments, some or all of system 100 is implemented in a system on a chip (SoC).

System 100 comprises a processor 110, a memory 140, a memory controller 130, and an input output memory management unit (IOMMU) 150 which are variously coupled to one another—e.g., via the illustrative processor bus 131, memory bus 132, and fabric 133. In the illustrative embodiment shown, memory 140 is coupled to support operation as a main memory of system 100—e.g., wherein one or more regions of memory 140 are variously allocated each to provide the state of a respective software process which is executed by processor 110. It will be appreciated that other embodiments are implemented entirely with circuitry of processor 110 (e.g., entirely with circuitry of the processor core 111). Additionally or alternatively, in other embodiments, system 100 includes any of various other combinations of devices coupled to processor 110—e.g., wherein system 100 omits IOMMU 150.

One embodiment is described in the context of a single processor desktop or server system, but alternative embodiments are included in a multiprocessor system. Processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to processor bus 131, which transmits data signals between the processor 110 and another component in system 100, such as memory controller 130, for storing data, address information and/or the like.

Processor 110 comprises one or more processor cores (including the illustrative core 111 shown) to execute instructions of system 100. The core 111 includes, but is not limited to, an instruction decoder 175 to decode the instructions which are provided by a pre-fetch unit (not shown), an execution unit 112 to execute instructions and the like. A register file 114 of core 111 is to store different types of data in registers including, but not limited to, integer registers, floating-point registers, vector registers, banked registers, shadow registers, checkpoint registers, status registers, configuration registers, instruction pointer register, and/or the like. In various embodiments, core 111 includes caches to variously cache non-decoded instructions, data, and/or decoded micro-operations. For example, such caches include, but are not limited to, a micro-operation cache 178 which is dedicated to caching only decoded micro-operations, and one or more other caches 173 which are to variously cache information other than any such decoded micro-operations. By way of illustration and not limitation, the one or more caches 173 include an instruction cache 174 which is to cache instructions which have yet to be decoded—e.g., instructions which are to be subsequently provided from instruction cache 174 to instruction decoder 175.

In various embodiments, a cache hierarchy includes some or all of the one or more caches 173—e.g., wherein the one or more caches 173 comprises a level one (L1) cache, a level two (L2) cache, a last level cache (LLC), and/or the like. In various embodiments, the one or more caches 173 includes a combination of one or more caches which are internal to core 111, and one or more caches which are external to core 111.

In one example, core 111 comprises a floating-point unit. In another example, processor 110 does not have a floating-point unit. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110.

Memory 140 illustrates any of a variety of one or more memory devices which are to provide some or all of a main memory of system 100. In an illustrative scenario according to one embodiment, various partitions and/or other allocated regions of memory 140 are setup, for example, at boot time by a basic input-output system (BIOS). Alternatively, processor 110 executes instructions of an operating system (OS), a virtual machine monitor (VMM) or other software agent which provides functionality to initialize, modify or otherwise determine an allocation of memory resources.

In an embodiment, processor 110 is coupled to (or alternatively, includes) a memory controller 130 which is to perform functions that enable processor 110 to access and communicate with memory 140. Memory 140 comprises random access memory (RAM) in a fixed or removable format. RAM includes volatile memory configured to hold information during the operation of system 100 such as, for example, static RAM (SRAM) or Dynamic RAM (DRAM). In some embodiments, memory controller 130 performs one or more operations which, for example, are adapted from conventional techniques for providing a processor with access to a main memory. Such conventional techniques are not detailed herein to avoid obscuring certain features of various embodiments which are not limited to said techniques.

In the example embodiment shown, a memory management unit (MMU) 116 of processor 110 provides functionality to manage access, via memory controller 130, to various regions of memory 140 by one or more processes which are executed with core 111 (and/or with one or more other cores of processor 110). By way of illustration and not limitation, MMU 116 determines an allocation of one or more pages in memory 140 to a given process, and (for example) configures a page table comprising page table entries each for a corresponding page of the process. For a given one of such page entries, the page table entry maps a physical address for the corresponding page to a virtual address for the corresponding page.

In one such embodiment, MMU 116 supports the implementation of a virtual address space, addresses of which are each to be mapped to a corresponding address in a physical address space. For example, software executed with processor 110 variously references or otherwise uses virtual addresses, which MMU 116 translates into respective physical addresses for use in accessing corresponding pages of memory 140. In an embodiment, MMU 116 includes or otherwise has access to a translation lookaside buffer (or "TLB", not shown) which provides a cache of recently accessed page table entries. In various embodiments, some or all operations by MMU 116 are adapted, for example, from conventional memory map techniques and/or mechanisms.

IOMMU 150 and device 160 illustrate any of a variety of other integrated circuit resources which, for example, are suitable to access or otherwise operate with processor 110 and memory 140. By way of illustration and not limitation, IOMMU 150 facilitates direct memory accesses by which device 160 reads data from, and/or writes data to, memory 140. Device 160 illustrates any of a variety of one or more endpoint devices, including a bus, or other endpoint hardware. In one embodiment, the one or more devices includes one or more integrated devices (e.g., integrated with some or all of processor 110, memory 140 and IOMMU 150) such as processor graphics. Alternatively or in addition, the one or more devices includes one or more discrete devices (such as Peripheral Component Interconnect express (PCIe™) devices or other attached devices), one or more legacy devices that do not support shared virtual memory, and/or the like. In one illustrative embodiment, the one or more devices includes one or more network controller devices, storage controller devices, peripheral controller devices (like Universal Serial Bus (USB) controllers), media controller devices, display controllers, and/or the like. Various alternative embodiments omit some or all of IOMMU 150, memory controller 130, memory 140 and/or device 160— e.g., wherein one or more such embodiments are implemented entirely with circuitry of processor 110.

In an illustrative scenario according to one embodiment, core 111 executes an operating system (OS) 142. In addition, one or more applications (including the illustrative application 146, for example) are executed with OS 142—e.g., wherein application 146 includes, or operates with, one or more driver processes which facilitate operations of IOMMU 150, device 160, and/or the like.

At some point during operation of system 100, memory 140 is provided with address information 148 which determines or otherwise indicates the allocation of various regions of memory 140 each for use by a respective software resource and/or hardware resource. In one such embodiment, address information 148 includes one or more page tables and/or other suitable data structures which specify or otherwise indicate a correspondence between addresses in different respective address spaces. In some embodiments, address information 148 is provided by operations (e.g., performed with a BIOS, OS 142, application 146 and/or other suitable boot time or runtime process) which, for example, are adapted from conventional memory mapping techniques. Some embodiments are not limited to a particular mechanism by which, and/or basis on which, regions of memory 140 are so allocated.

In an embodiment, tag evaluation circuitry 172 of core 111 is coupled to receive an instruction pointer for—or other identifier of—a next instruction which is to be decoded or otherwise prepared for execution by execution unit 112 (for example). By way of illustration and not limitation, such an instruction pointer is provided by an instruction pointer unit 171 which, for example, is included in a pre-fetch unit of core 111. Based on the instruction identifier, tag evaluation circuitry 172 searches the one or more caches which are currently in the cache pool to determine whether there is a cached version of one or more micro-operations which were generated based on a previous decoding of a similar instruction. By way of illustration and not limitation, micro-operation cache 178 searches at least micro-operation cache 178 (and, for example, searches any of the one or more caches 173 which are currently configured to operate as a supplementary cache of the cache pool).

Where the cache search results in a hit on a cache of the cache pool, the cached version of the one or more micro-operations is provided for execution by execution unit 112—e.g., via the illustrative micro-operation buffer 176 shown. Where the cache search instead results in a miss on the cache pool, a non-decoded version of the instruction is provided to instruction decoder 175—e.g., by the instruction cache 174—for decoding to generate the one or more micro-operations.

To facilitate efficient caching of micro-operations, system 100 further comprises cache management circuitry 177 to monitor one or more metrics of performance by the cache pool. Based on the one or more metrics, cache management circuitry 177 performs one or more evaluations to determine (for example) whether a condition of cache pool performance satisfies a given one or more predetermined criteria for enabling—or alternatively, for disabling—a supplementary cache functionality which is provided at core 111. Based on such one or more evaluations, cache management circuitry 177 selectively enables the use of instruction cache 174 (or another of the one or more caches 173) as a supplementary cache of the cache pool, or alternatively, disables said use of a supplementary cache.

In some embodiments, an architecture of processor 110 supports an instruction set 120 which includes a first instruction for explicitly enabling a supplementary cache functionality which is provided at core 111. For example, execution of this first instruction includes or otherwise results in an operational parameter value being written to a control register (or any of various other suitable registers of processor 110) for configuring a mode of cache management circuitry 177 which enables the cache pool to include one or more supplementary caches. In one such embodiment, instruction set 120 further includes a second instruction for explicitly disabling the supplementary cache functionality provided at core 111—e.g., wherein execution of the second instruction includes or otherwise results in the control register being accessed to configure an alternative mode of cache management circuitry 177 (to prevent the cache pool from including any supplementary cache).

FIG. 2 shows features of a method 200 to cache one or more micro-operations of a decoded instruction according to an embodiment. Method 200 illustrates one example of an embodiment wherein a core of a processor performs operations to determine a size of a pool of one or more caches which are to be available for caching micro-operations. Such a cache pool includes at least one micro-operation cache (i.e., a cache which is dedicated to caching only micro-operations), and is subject to also including one or more supplementary caches, depending on one or more characteristics of the performance of the cache pool. Operations such as those of method 200 are performed, for example, with processor core 111.

As shown in FIG. 2, method 200 comprises (at 210) monitoring a performance of multiple caches of the processor core. The multiple caches comprise a first (micro-ops) cache and a second cache, wherein the second cache is coupled to receive data, or to receive instructions which are to be subsequently provided to an instruction decoder of the core.

Based on the performance monitoring performed at 210, method 200 (at 212) detects an instance of a first cache utilization condition wherein a first utilization metric is above a threshold level. In one such embodiment, the first utilization metric is a number of hits on the first cache, a rate of hits on the first cache, a number of entries in the first cache, and/or any of various other indications that cache pool performance might improve with the addition of at least one supplementary cache. Based on the first cache utilization condition detected at 212, method 200 (at 214) adds the second cache to the cache pool.

Although various embodiments are not limited in this regard, method 200 further comprises (at 216) storing a first one or more micro-operations to the second cache—e.g., based on the second cache being enabled at 214 to operate as a supplementary cache of the cache pool. In various embodiments, one or more other caching operations are also performed while the cache pool includes the second cache. In one such embodiment, these other caching operations include moving one or more other micro-operations between the first cache and the second cache. For example, the one or more other micro-operations are moved from the second cache to the first cache based on a hit on the second one or more micro-operations at the second cache. Alternatively, the one or more other micro-operations are moved from the first cache to the second cache—e.g., based on an indication that any hits on the one or more other micro-operations in the first cache are, according to a predetermined criteria, insufficient in number and/or frequency.

In some embodiments, method 200 additionally or alternatively comprises operations to decrease a size of the cache pool based on one or more other cache performance characteristics. By way of illustration and not limitation, method 200 further comprises (at 218) detecting an instance of a second cache utilization condition wherein a second utilization metric is below a second threshold level. For example, the second cache utilization condition includes a rate of hits on some or all supplementary caches of the cache pool being below a threshold minimum (or similarly, a corresponding rate of misses on some or all supplementary caches of the cache pool being above a threshold maximum). Based on the second cache utilization condition detected at 218, method 200 (at 220) removes the second cache from the cache pool.

Figure 3:
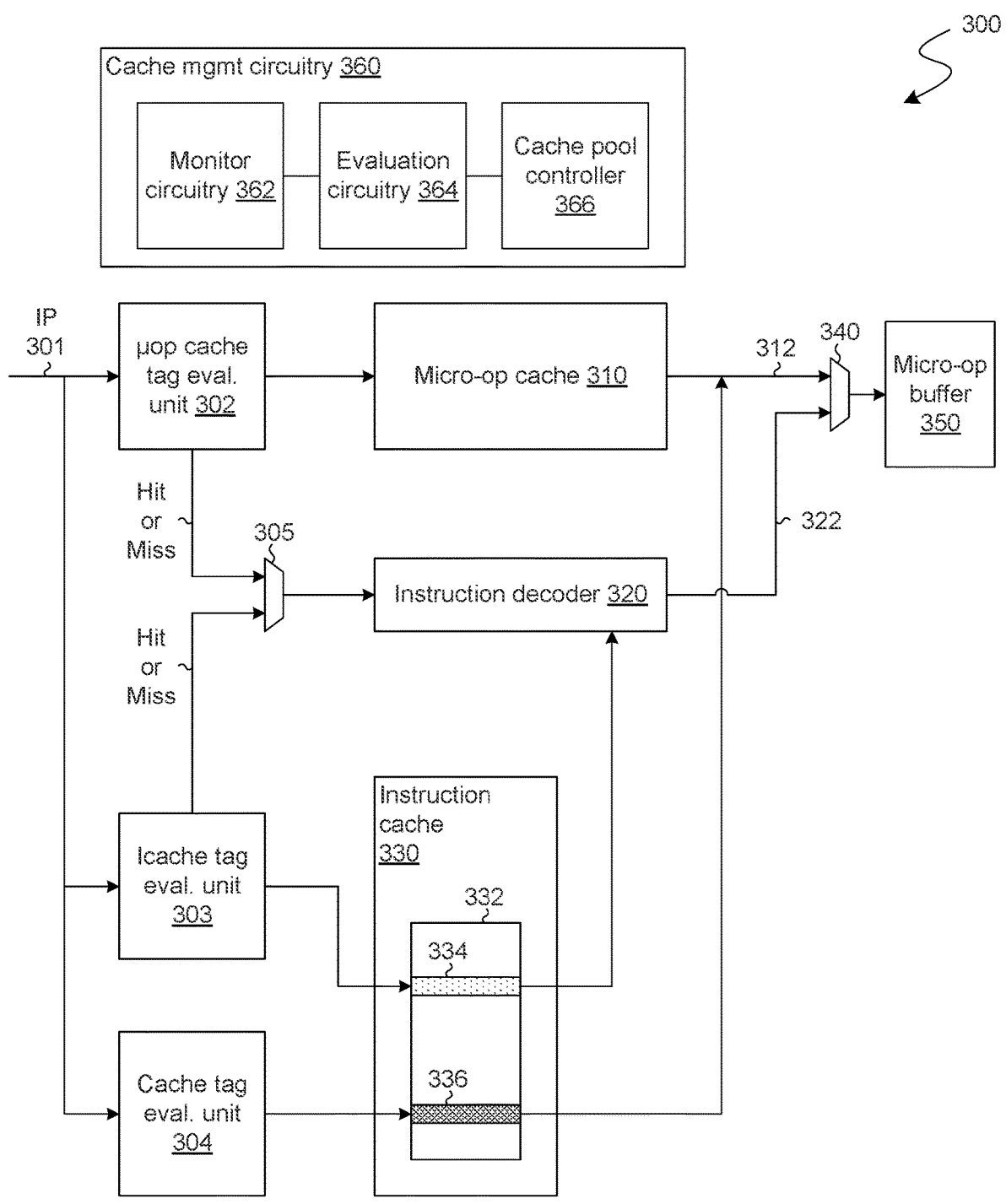
FIG. 3 shows a functional block diagram illustrating features of a core to provide access to a cache according to an embodiment.

FIG. 3 shows features of a processor core 300 to provide access to a supplemental cache according to an embodiment. Core 300 illustrates one example of an embodiment which is able to add a cache, other than a dedicated micro-operation cache, to a cache pool which is to be available for caching micro-operations generated by an instruction decoder. In various embodiments, core 300 provides functionality such as that of core 111—e.g., wherein one or more operations of method 200 are performed with core 300.

As shown in FIG. 3, core 300 comprises a μop cache 310, an instruction decoder 320, an instruction cache (Icache) 330, a micro-operation buffer 350, and a cache management circuitry 360 which, for example, correspond functionally to micro-operation cache 178, instruction decoder 175, instruction cache 174, micro-operation buffer 176, cache management circuitry 177 (respectively). Core 300 further comprises μop cache tag evaluation unit 302, Icache tag evaluation unit 303, and second cache tag evaluation unit 304, which variously provide functionality such as that of tag evaluation circuitry 172

For example, some or all of μop cache tag evaluation unit 302, Icache tag evaluation unit 303, and cache tag evaluation unit 304 are variously coupled each to receive an identifier—such as the illustrative instruction pointer (IP) 301 shown—of a next instruction which is to be prepared for execution by core 300. In one such embodiment, μop cache tag evaluation unit 302 provides functionality to generate or otherwise determine a tag value which corresponds to IP 301, and to search μop cache 310—based on the tag value—for a cached version (if any) of one or more micro-operations which were previously generated based on an earlier decoding of an instruction corresponding to IP 301. Multiplex circuitry 305 of core 300 is coupled to receive from μop cache tag evaluation unit 302 an indication of whether the search of μop cache 310 resulted in a hit or a miss.

Furthermore, the Icache tag evaluation unit 303 provides functionality to similarly generate or otherwise determine a corresponding tag value based on IP 301, and to search Icache 330 for a cached, non-decoded version (if any) of the instruction which is identified by IP 301. Multiplex circuitry 305 is further coupled to receive from Icache tag evaluation unit 303 another indication of whether the search for the non-decoded instruction in Icache 330 resulted in a hit or a miss.

In an illustrative scenario according to one embodiment, a cache pool of core 300 includes at least μop cache 310—e.g., wherein, at different times, core 300 is variously configured to also include some other one or more caches (such as Icache 330) in the cache pool. In one such embodiment, during a time when the cache pool also includes Icache 330, the cache tag evaluation unit 304 generates or otherwise determines a corresponding tag value based on IP

301, and searches Icache 330 for a cached version (if any) of one or more micro-operations which were previously generated based on an earlier decoding of an instruction corresponding to IP 301. In various embodiments, multiplex circuitry 305 is further coupled to receive from cache tag evaluation unit 304 another indication (not shown) of whether the search for the one or more micro-operations in Icache 330 resulted in a hit or a miss.

Based on received signals, multiplex circuitry 305 signals to instruction decoder 320 whether to retrieve a non-decoded instruction from Icache 330. In an illustrative scenario according to one embodiment, instruction decoder 320 receives from the cache lines 332 of Icache 330 a cached, non-decoded instruction cached instruction 334—e.g., where μop cache tag evaluation unit 302 and cache tag evaluation unit 304 each indicate a respective cache miss based on IP 301. The cached instruction 334 is then decoded by instruction decoder 320, resulting in the generation of one or more μop(s) 322 which, in one embodiment, are provided to multiplex circuitry 340 of core 300.

In an alternative scenario, the various cache searches based on IP 301 result in one or more cached μop(s) 312 being provided to multiplex circuitry 340 by a cache which is currently in the cache pool (e.g., by one of μop cache 310 or Icache 330). By way of illustration and not limitation, said cache searches—e.g., performed while Icache 330 is in the cache pool—result in a hit on one or more cached μtop(s) 336 in cache lines 332. Alternatively, cached μop(s) 312 are provided by μop cache 310—e.g., during operations of core 300 while Icache 330 is not in the cache pool, or while the cached μop(s) 336 are otherwise absent from cache lines 332.

In an embodiment, a micro-operation buffer 350 of core 300 receives from multiplex circuitry 340 the cached μop(s) 312, or the μop(s) 322, which are provided to multiplex circuitry 340 based on IP 301. For example, micro-operation buffer 350 buffers the one or more micro-operations in preparation for their subsequent execution with an execution engine (not shown) of core 300.

To facilitate efficient caching of micro-operations, monitor circuitry 362 of cache management circuitry 360 is coupled to monitor one or more metrics of performance by the cache pool—e.g., wherein the one or more metrics include a number of hits on a corresponding one or more caches, a number of misses on the corresponding one or more caches, a rate of hits, a rate of misses, and/or the like. Based on the one or more metrics monitored with monitor circuitry 362, evaluation circuitry 364 of cache management circuitry 360 performs one or more evaluations to determine (for example) whether a condition of cache pool performance satisfies a given one or more predetermined criteria for enabling—or alternatively, for disabling—a supplementary cache functionality which is provided by cache management circuitry 360. Based on the one or more evaluations, cache pool controller 366 of cache management circuitry 360 provides one or more communications—or alternatively, prevents one or more other communications—to selectively enable the use of Icache 330 (for example) as a supplementary cache of the cache pool, or alternatively, to disable said use of Icache 330 as a supplementary cache.

Figure 4:
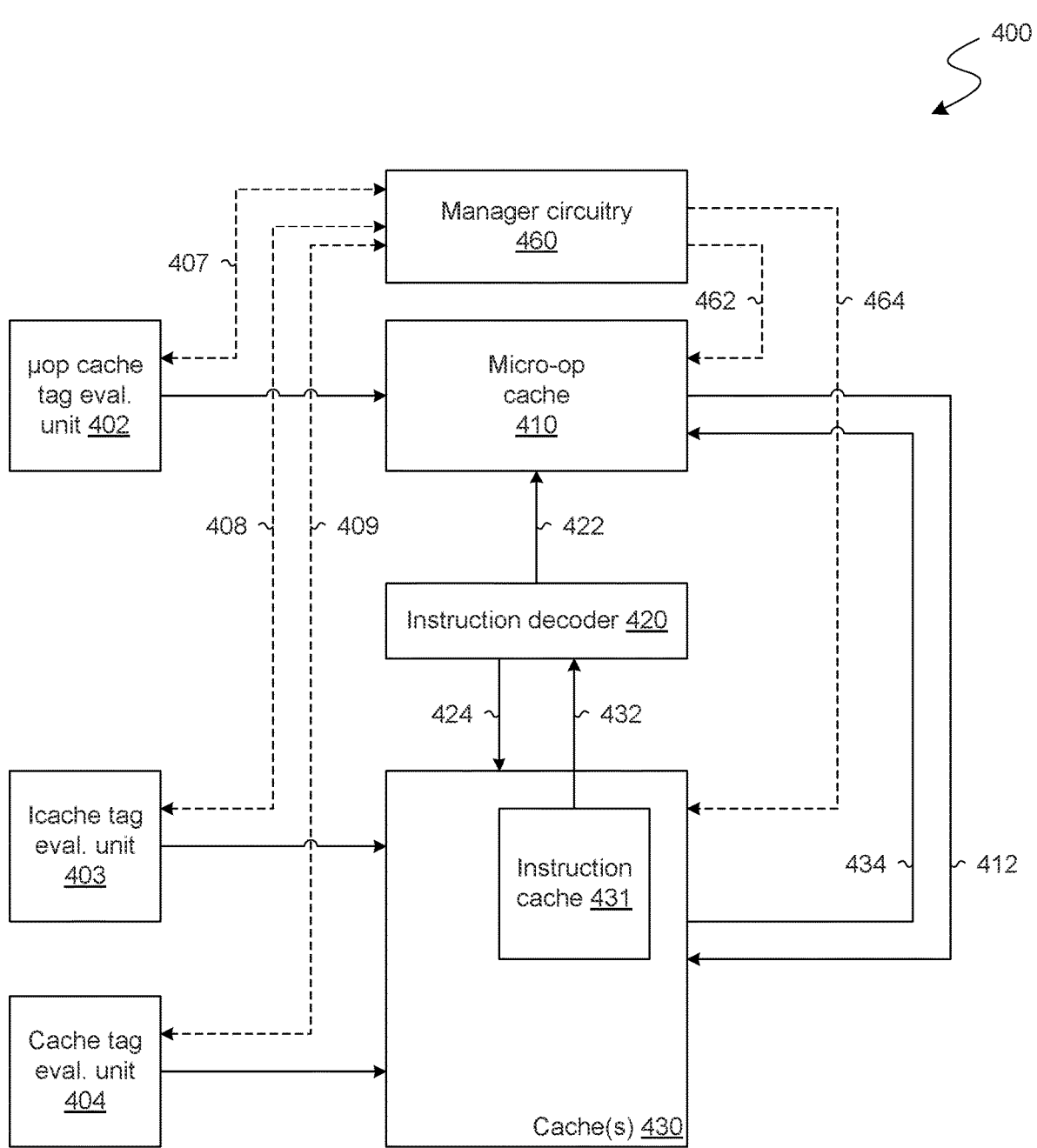
FIG. 4 shows a functional block diagram illustrating features of a core to operate multiple caches according to an embodiment.

FIG. 4 shows features of a processor core 400 to operate multiple caches according to an embodiment. Core 400 illustrates one example of an embodiment which is able to move micro-operations between different caches in a pool of caches which includes at least one dedicated micro-operation cache and, at various times, one or more supplementary caches. In various embodiments, core 400 provides functionality such as that of core 111 or core 300—e.g., wherein one or more operations of method 200 are performed with core 400.

As shown in FIG. 4, core 400 comprises a μop cache 410, an instruction decoder 420, and manager circuitry 460 which, for example, correspond functionally to μop cache 310, instruction decoder 320, and cache management circuitry 360 (respectively). Furthermore, core 400 comprises one or more caches 430 including an instruction cache 431 that, for example, provides functionality of Icache 330. Further still, core 400 comprises a μop cache tag evaluation unit 402, an Icache tag evaluation unit 403, and another cache tag evaluation unit 404 which correspond functionally to μop cache tag evaluation unit 302, Icache tag evaluation unit 303, and cache tag evaluation unit 304 (respectively).

In the example embodiment shown, μop cache tag evaluation unit 402, Icache tag evaluation unit 403, and cache tag evaluation unit 404 are variously coupled to participate in respective communications 407, 408, 409 with manager circuitry 460. Based on such communications, manager circuitry 460 monitors the performance of one or more caches—e.g., including any caches which are currently in a cache pool for providing cached versions of micro-operations variously generated by instruction decoder 420. Based on this performance monitoring, manager circuitry 460 determines—e.g., during operation of core 400—whether a given cache is to be added to (or alternatively, removed from) the cache pool.

For example, instruction cache 431 is coupled to provide a non-decoded instruction 432 to instruction decoder 420. Furthermore, instruction decoder 420 is coupled to provide to μop cache 410 a first one or more micro-operation(s) 422 which are generated by the decoding of a first instruction. Further still, instruction decoder 420 is coupled to provide a second one or more micro-operation(s) 424—which are generated by the decoding of a second instruction—to a supplementary cache of the cache pool (when the one or more caches 430 include that supplementary cache).

In one such embodiment, manager circuitry 460 provides functionality to monitor one or more performance characteristics of the cache pool, and to selectively move a given one or more micro-operations between caches of the cache pool. By way of illustration and not limitation, manager circuitry 460 participates in additional signal 462 with μop cache 410 and/or additional signal 464 with one or more caches 430 to selectively move micro-operations between different caches in the cache pool.

In an illustrative scenario according to one embodiment, manager circuitry 460 signals that a supplementary cache in the one or more caches 430 is to provide one or more micro-operations 434 to μop cache 410. Such provisioning of the micro-operation(s) 434 to μop cache 410 is performed (for example) based on a hit on the micro-operation(s) 434 in the one or more caches 430.

In another illustrative scenario, manager circuitry 460 signals that μop cache 410 is to provide one or more micro-operations 412 to a supplementary cache in the one or more caches 430. Such provisioning of the micro-operation(s) 412 to a supplementary cache is performed (for example) based on an indication of an underutilization of the micro-operation(s) 412—e.g., based on the exceeding of some threshold minimum number of consecutive searches of the cache pool which targeted micro-operations other than the micro-operation(s) 412. In one such embodiment, the supplementary cache operates in part as a victim cache with respect to μop cache 410 (e.g., in addition to that supplementary cache concurrently operating as a data cache, or as an instruction cache).

In various embodiments, a given one or more micro-operations are provided by instruction decoder 420 first to μop cache 410, wherein the cached one or more micro-operations are subject to being subsequently migrated from μop cache 410 to a supplementary cache of the cache pool. For example, this migration is based on an underutilization of the one or more micro-operations, or is based on a need to create room in μop cache 410 for a more recently generated one or more micro-operations from instruction decoder 420.

In various other embodiments, a given one or more micro-operations are provided by instruction decoder 420 first to a supplementary cache—e.g., unless there is sufficient room available in μop cache 410. The given one or more micro-operations are subject to being subsequently migrated from the supplementary cache to μop cache 410—e.g., based on a hit on the one or more micro-operations in that supplementary cache.

Figure 5:
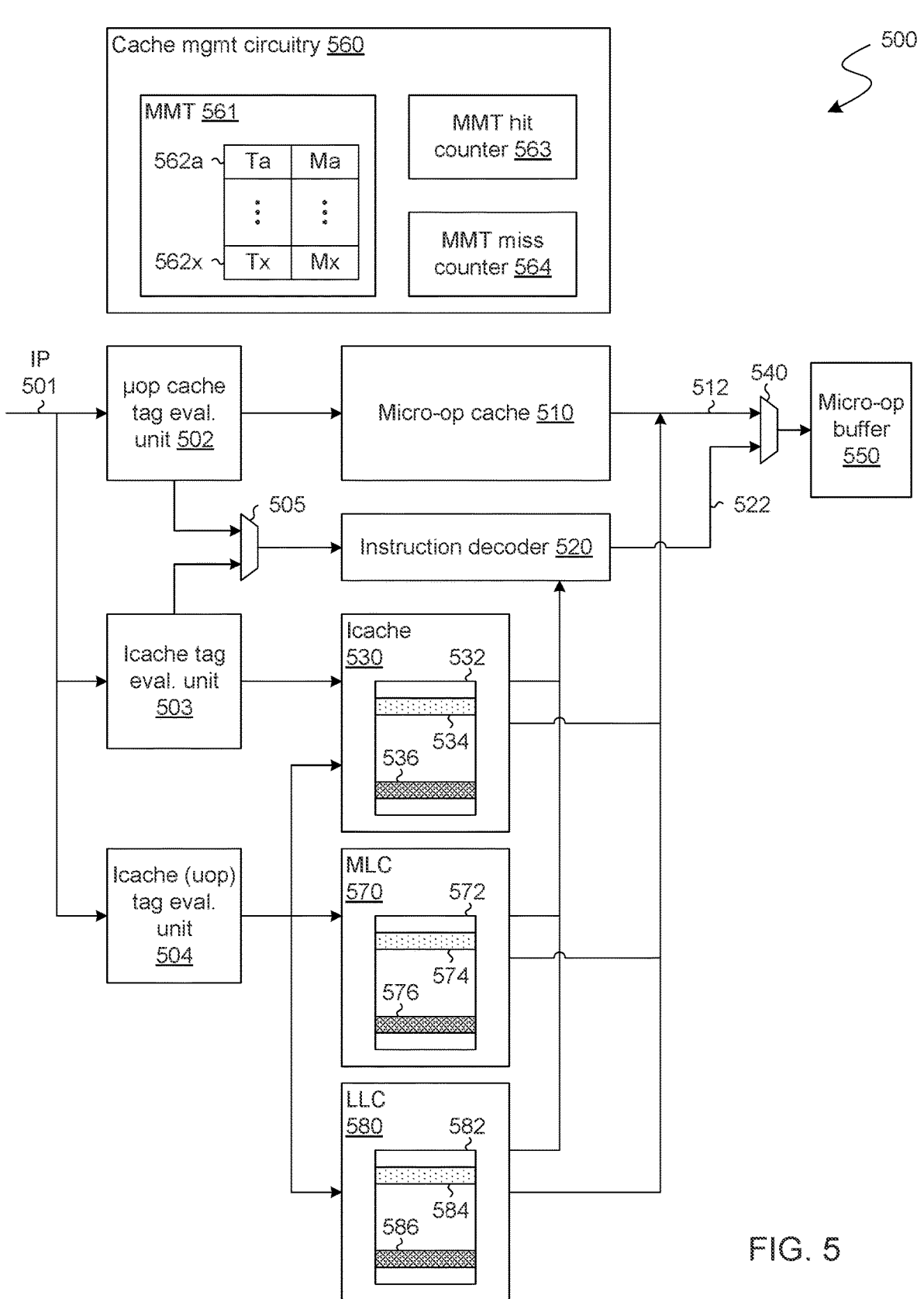
FIG. 5 shows a functional block diagram illustrating features of a core to provide a supplemental cache for micro-operations according to an embodiment.

FIG. 5 shows features of a processor core 500 to provide a supplemental cache for micro-operations according to an embodiment. Core 500 illustrates one example of an embodiment which is able to selectively add to (and/or remove from) a cache pool any of multiple caches including one or more in a hierarchy of caches. In various embodiments, core 500 provides functionality such as that of one of cores 111, 300, 400—e.g., wherein one or more operations of method 200 are performed with core 500.

As shown in FIG. 5, core 500 comprises a μop cache 510, an instruction decoder 520, and cache management circuitry 560 which, for example, correspond functionally to μop cache 310, instruction decoder 320, and cache management circuitry 360 (respectively). Core 500 further comprises—in addition to an instruction cache (Icache) 530—a mid-level cache (MLC) 570, and a last level cache (LLC) 580 which are each in a cache hierarchy. Icache 530, MLC 570, and LLC 580 provide functionality such as that of the one or more caches 430—e.g., wherein Icache 530 corresponds functionally to Icache 330 or instruction cache 431.

In one such embodiment, core 500 further comprises μop cache tag evaluation circuitry 502, Icache tag evaluation circuitry 503, Icache/μop tag evaluation circuitry 504, multiplex circuitry 505, multiplex circuitry 540, and micro-operation buffer 550 which, for example, correspond functionally to μop cache tag evaluation unit 402, Icache tag evaluation unit 403, cache tag evaluation unit 404, multiplex circuitry 305, multiplex circuitry 340, and micro-operation buffer 350 (respectively). For example, multiplex circuitry 505 is coupled to indicate whether instruction decoder 520 is to retrieve an instruction from Icache 530—e.g., wherein multiplex circuitry 540 is to selectively provide to micro-operation buffer 550 either one or more μop(s) 522 generated by 520 based on an instruction pointer (IP) 501, or a previously cached one or more μop(s) 512 which correspond to IP 501.

In an embodiment, a pool of one or more caches of core 500—where the one or more caches are to be available for variously receiving respective micro-operations—includes at least μop cache 510. At different times during operation of core 500, such a cache pool is to variously include an additional one or more other supplementary caches. In an illustrative scenario according to one embodiment, at some point, the cache pool further comprises Icache 530, MLC 570, and LLC 580. By way of illustration and not limitation, cache lines 532 of Icache 530 comprise a cached instruction 534, and concurrently comprise a cached one or more μops 536 which are based on the previously decoding of a corresponding instruction. Alternatively, or in addition, cache lines 572 of MLC 570 comprise cached data 574 (i.e., other than any instruction or previously decoded micro-operations), and concurrently comprises a cached one or more μops 576 which are based on the previously decoding of a corresponding instruction. Alternatively, or in addition, cache lines 582 of LLC 580 comprise cached data 584, and concurrently comprises a cached one or more μops 586 which are based on the previously decoding of a corresponding instruction. By way of illustration and not limitation, in one such embodiment, a given entry of a supplementary cache includes two additional bits—e.g., wherein a first such bit is to indicate whether the entry in question stores decoded micro-operations, and wherein a second such bit indicates whether the following way (for example) in that supplementary cache also needs to be fetched.

In various embodiments, cache management circuitry 560 includes or is otherwise coupled to access a micro-op cache monitoring table (MMT) 561—or other suitable data structure—to track performance information which specifies or otherwise indicates one or more metrics of utilization of the cache pool. In one such embodiment, entries 562a, ..., 562x of MMT 561 include respective tags Ta, ..., Tx each for a corresponding one or more micro-operations which have been recently decoded and provided to the cache pool—e.g. wherein MMT 561 does not actually store the actual micro-operations.

Although some embodiments are not limited in this regard, entries 562a, ..., 562x further comprise respective metric values Ma, ..., Mx which each indicate (for example) a total number of hits on the corresponding entry, a recency of a latest hit on the corresponding entry, a time when corresponding entry was created in MMT 561, and/or any of various other types of utilization information. In some embodiments, cache management circuitry 560 further provides functionality to maintain a MMT hit counter 563 which tracks a number of hits on the cache pool, and a MMT miss counter 564 which tracks a number of misses on the cache pool.

Based on metric values Ma, ..., Mx, the count of MMT hits, the count of MMT misses, and/or other such performance information, cache management circuitry 560 is operable to add a given supplementary cache to the cache pool—e.g., based on an indication that μop cache 510 is overutilized according to some predetermined criteria. Alternatively or in addition, cache management circuitry 560 is similarly operable to remove a given supplementary cache from the cache pool—e.g., based on an indication that the supplementary cache in question underutilized according to some other predetermined criteria.

FIG. 6 shows features of a method 600 to operate caches of a processor according to an embodiment. Method 600 illustrates one example of an embodiment wherein a size of a cache pool—e.g., including the selective inclusion (or exclusion) of a supplementary cache in the cache pool—is determined based on cache pool performance information such as that which is provided in a micro-operation caching monitor table (e.g., MMT 561). Operations such as those of method 600 are performed, for example, with a processor core such as one of cores 111, 300, 400. In an embodiment, method 200 includes, or is otherwise performed with, operations of method 600.

As shown in FIG. 6, method 600 comprises (at 610) determining one or more performance metrics of the cache pool based on information which is maintained at a micro-operation caching monitor table (MMT). In various embodiments, the one or more performance metrics comprise some or all of a number of hits on the cache pool, a number of misses on the cache pool, a number of hits on a particular cache which is in the cache pool, or a number of misses on a particular cache which is in the cache pool. In one such embodiment, the determining at 610 comprises calculating a rate of hits on the cache pool—e.g., as a ratio of a number of hits on the cache pool to a number of searches of the cache pool. Alternatively or in addition, the determining at 610 comprises calculating a rate of hits on a micro-operation cache of the cache pool—e.g., as a ratio of a number of hits on the micro-operation cache to a number of searches of the micro-operation cache.

Method 600 further comprises performing an evaluation (at 612) to identify, based on the determining at 610, whether the supplementary cache(s)—if any—in the cache pool are being utilized. By way of illustration and not limitation, the evaluating at 612 is to determine whether a first rate of hits on the cache pool is greater than a second rate of hits on the micro-operation cache of the cache pool. Such an evaluation is to determine, for example, whether any supplementary cache(s) which might be currently in the cache pool have been experiencing hits—e.g., at least in some most recent evaluation period.

Where it is determined at 612 that the first rate of hits is less than (or, for example, equal to) the second rate of hits, method 600 (at 620) disables, if currently enabled, a supplemental cache mode—e.g., by removing the supplemental cache(s) from the cache pool of the processor core, or by otherwise limiting the cache pool to only a micro-operation cache of that processor core. After the disabling at 620, method 600 performs a next instance of the determining at 610.

Where it is instead determined at 612 that the first rate of hits is greater than the second rate of hits, method 600 (at 614) enables the supplemental cache mode, if the mode is currently disabled—e.g., by adding one or more other supplementary caches to the cache pool. After the enabling at 614—e.g., after some period of time during which uops caching is performed based on the enabled supplemental cache mode—method 600 (at 616) determines one or more other metrics of performance by the supplementary cache(s) which are currently in the cache pool. In an embodiment, the determining at 616 includes identifying a number of misses on a particular supplementary cache of the cache pool, or (in some embodiments) determining a total number of misses on all supplementary caches of the cache pool.

Method 600 subsequently performs an evaluation (at 618) to identify, based on the performance metrics which are determined at 616, whether the supplementary cache(s) in the cache pool are being underutilized. By way of illustration and not limitation, the evaluating at 618 is to determine whether a rate of misses on the supplementary cache(s) of the cache pool is greater than it was determined to be at some earlier evaluation period. Where it is determined at 618 that the miss rate is not increasing, method 600 performs a next instance of the determining at 610. Where it is instead determined at 618 that the miss rate is increasing, method 600 disables the supplemental cache mode—e.g., by removing the supplemental cache(s) from the cache pool—before performing a next instance of the determining at 610.

Figure 7:
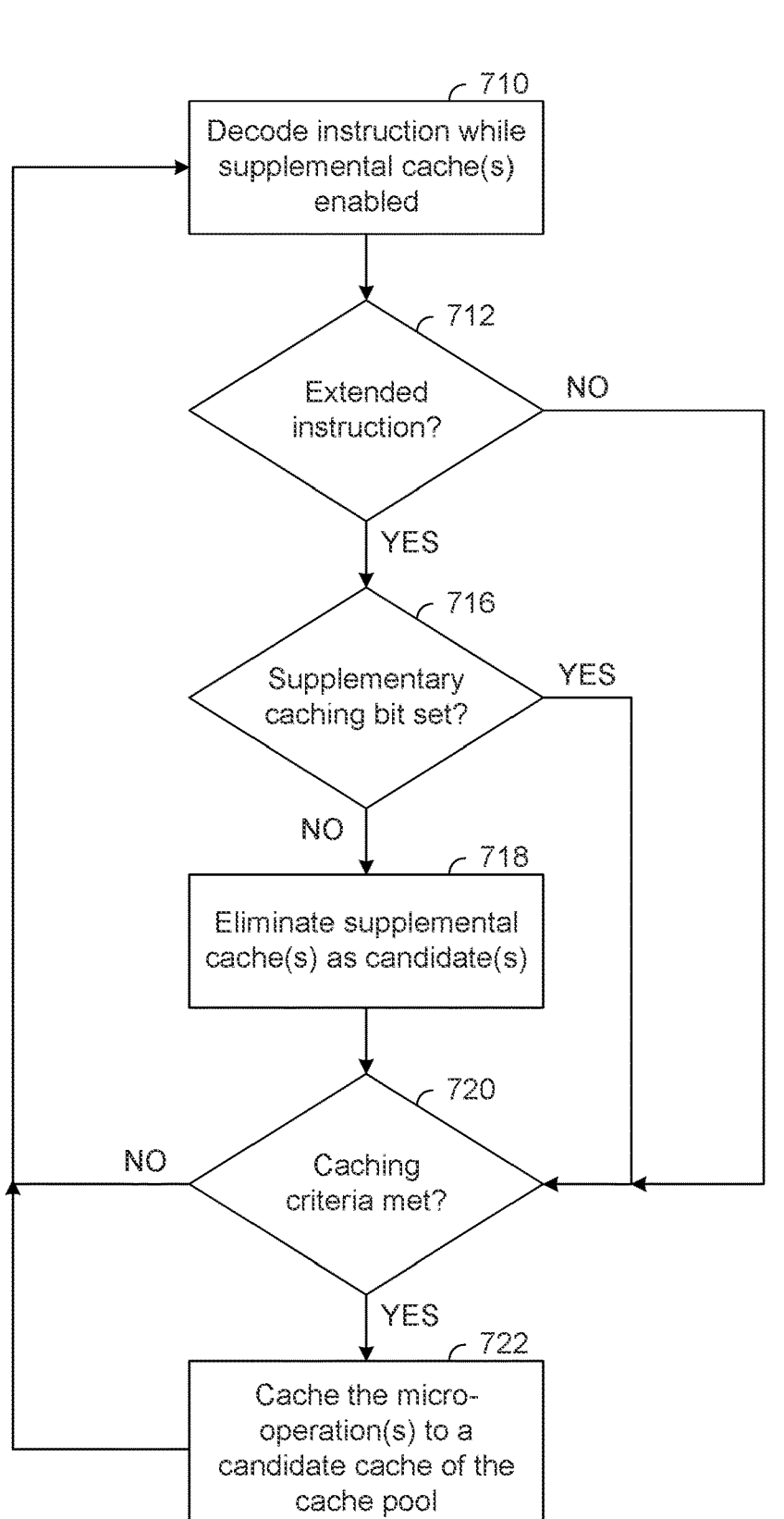

FIG. 7 shows features of a method 700 to operate caches of a processor according to another embodiment. Method 700 illustrates one example of an embodiment which supports a type of instruction to facilitate micro-operation caching, wherein an operand of the instruction specifies whether (or not) a particular one or more microoperations can be provided to a supplementary cache. Operations such as those of method 700 are performed, for example, with circuitry of processor 110, or one of cores 300, 400, 500. In some embodiments, method 700 includes, or is performed in combination with method 200 and/or method 600 (for example).

As shown in FIG. 7, method 700 comprises (at 710) decoding an instruction while supplemental caching is enabled (i.e., while the cache pool comprises multiple caches including at least one cache other than one which is dedicated to caching only micro-operations). For example, in some embodiments, an instruction set architecture of the processor supports an instruction (e.g., other than the one which is decoded at 710) which explicitly enables supplemental micro-operation caching. The instruction set architecture further supports still another instruction which explicitly disables such supplemental micro-operation caching. By way of illustration and not limitation, these two instructions are respective mode set instructions, each to access a control register (or any of various other suitable processor registers) which configures a mode of cache management—e.g., the mode provided with cache management circuitry 177, cache management circuitry 360, manager circuitry 460, or cache management circuitry 560, for example. The instruction at 710 is decoded during a cache management mode which enables supplementary micro-operation caching wherein the cache pool includes multiple caches.

In one such embodiment, the instruction set architecture further supports an instruction type—referred to herein as an "extended" instruction type—wherein a given instruction includes an additional field to provide an operand for specifying whether (or not) the one or more micro-operations, generated by the decoding of that given instruction, can be provided to any cache of the cache pool, or only to a dedicated micro-operations cache.

Referring again to FIG. 7, method 700 further comprises performing an evaluation (at 712) to determine whether the instruction decoded at 710 is of the extended instruction type described above. Where it is determined at 712 that the instruction is not of the extended instruction type, method 700 (at 720) performs an evaluation to determine whether one or more criteria have been met for caching the one or more micro-operations which were generated by the decoding at 710. For example, the evaluation at 720 includes determining whether any previously cached micro-operations are sufficiently underutilized to warrant eviction from the pool or, for example, eviction from the micro-operations cache to another, supplementary cache of the cache pool. Where it is determined at 720 that the criteria have not been met, method 700 performs a next instance of the decoding at 710—i.e., for a next instruction which is to be decoded in preparation for execution. Where it is instead determined at 720 that the criteria have been met, method 700 (at 722) caches the one or more micro-operations to an available cache of the cache pool (also referred to as a "candidate" cache herein). After the caching at 722, method 700 performs a next instance of the decoding at 710.

Where it is instead determined at 712 that the instruction is of the extended instruction type, method 700 performs another evaluation (at 716) to determine whether the additional field is set to a value which allows the supplementary cache(s) of the cache pool to be candidate(s) for receiving the one or more micro-operations which were generated by the decoding at 710. Where it is determined at 716 that the value in the additional field is so set, method 700 performs a next instance of the evaluating at 720—i.e., wherein each cache in the cache pool is a candidate to receive the one or more micro-operations which were generated by the decoding at 710.

Where it is instead determined at 716 that the value in the additional field is not so set, method 700 (at 718) eliminates the supplementary cache(s) which are currently in the cache pool as candidates to receive the one or more micro-operations which were generated by the decoding at 710. More particularly, based on the value of the additional field, the micro-operation cache is selected over the supplementary cache(s) for receiving the one or more micro-operations. It is to be noted, however, that these supplementary cache(s) nevertheless remain in the cache pool—e.g., as potential candidate caches for the sake of any other instruction to be processed according to method 700. After the supplementary cache(s) are eliminated at 718, method 700 performs a next instance of the evaluating (at 720).

Figure 8:
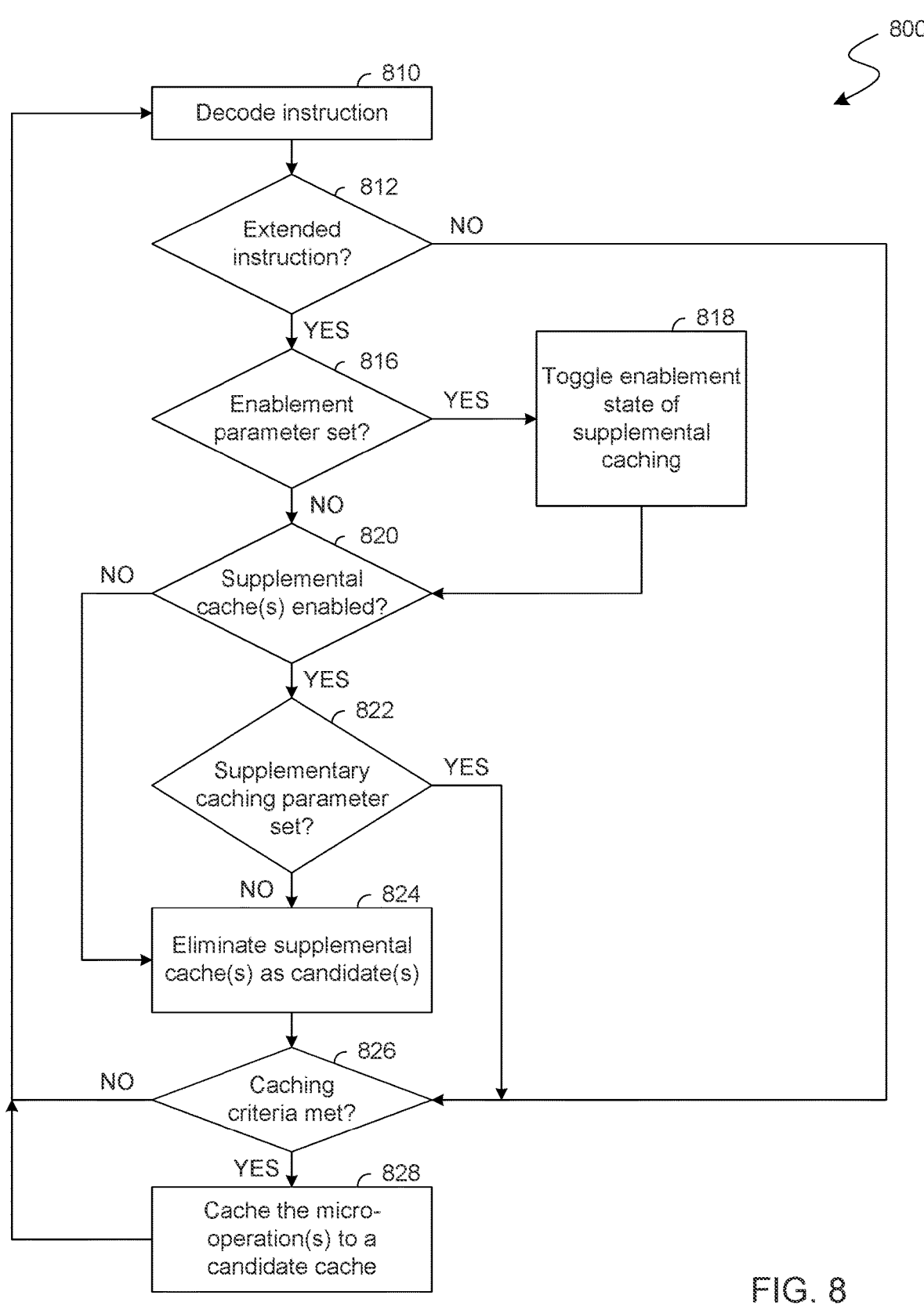

FIG. 8 shows features of a method 800 to operate caches of a processor according to another embodiment. Method 800 illustrates one example of an embodiment which supports another type of extended instruction, which further comprises an additional operand for specifying whether supplementary caching is to be enabled or disabled—i.e., whether (or not) the cache pool is to include any supplementary caches. Operations such as those of method 800 are performed, for example, with circuitry of processor 110, or one of cores 300, 400, 500. In some embodiments, method 800 includes, or is performed in combination with some or all of methods 200, 600, 700 (for example).

As shown in FIG. 8, method 800 comprises (at 810) decoding an instruction to generate one or more micro-operations. For example, in some embodiments, an instruction set architecture of the processor supports an extended instruction type which includes two additional fields. One of the two fields is to provide a first operand (e.g., a first flag bit) which specifies or otherwise indicates whether supplementary caching is to be disabled or enabled "globally" in a given core—i.e., for the instruction which is decoded at 810, and for any other instructions processed by that given core with method 800, at least until the enablement state is subsequently changed. The other of the two fields is to provide a second operand (e.g., a second flag bit) which specifies whether or not the supplementary cache(s)—if any—which are currently in the cache pool are to be included (or alternatively, excluded) for availability each as a candidate to receive the one or more micro-operations generated at 810.

Referring again to FIG. 8, method 800 further comprises performing an evaluation (at 812) to determine whether the instruction decoded at 810 is of the extended instruction type described above. Where it is determined at 812 that the instruction is not of the extended instruction type, method 800 (at 826) performs an evaluation to determine whether one or more criteria have been met for caching the one or more micro-operations which were generated by the decoding at 810. For example, the evaluation at 826 corresponds functionally to the evaluation at 720 in method 700. Where it is determined at 826 that the criteria have not been met, method 800 performs a next instance of the decoding at 810—i.e., for a next instruction which is to be decoded in preparation for execution. Where it is instead determined at 826 that the criteria have been met, method 800 (at 828) caches the one or more micro-operations to an available candidate cache of the cache pool. After the caching at 828, method 800 performs a next instance of the decoding at 810.

Where it is instead determined at 812 that the instruction is of the extended instruction type, method 800 performs another evaluation (at 816) to determine whether the above-described first additional field of the instruction sets an enablement parameter to a value which is for changing a state of enablement of the supplementary cache functionality. Where it is determined at 816 that the first additional field is so set, method 800 toggles the cache management functionality of the processor core in question—e.g., between a first mode wherein a supplementary cache functionality is enabled in that core and a second mode wherein the supplementary cache functionality is disabled in that core. However, such toggling at 818 is omitted where it is instead determined at 816 that the the enablement parameter is not set to the corresponding value.

Subsequently, method 800 performs two evaluations—at 820 and 822—to determine whether or not the supplementary cache(s)—if any—which are currently in the cache pool are to be included (or alternatively, excluded) for availability each as a candidate to receive the one or more micro-operations generated at 810. For example, the evaluation at 820 determines whether the supplementary cache functionality is currently enabled, and the evaluation at 822 determines whether any potential caching of the one or more micro-operations is to be limited to caching at the micro-operation cache—i.e., to the exclusion of any supplementary cache(s) which might also be in the cache pool currently.

In the case where supplementary cache functionality is currently enabled and the one or more micro-operations are limited to caching only at the micro-operation cache, method 800 eliminates the supplementary cache(s) of the cache pool (if any) from candidacy to receive the one or more micro-operations. After any such eliminating at 824, method 800 performs the evaluating at 826.

Figure 9:
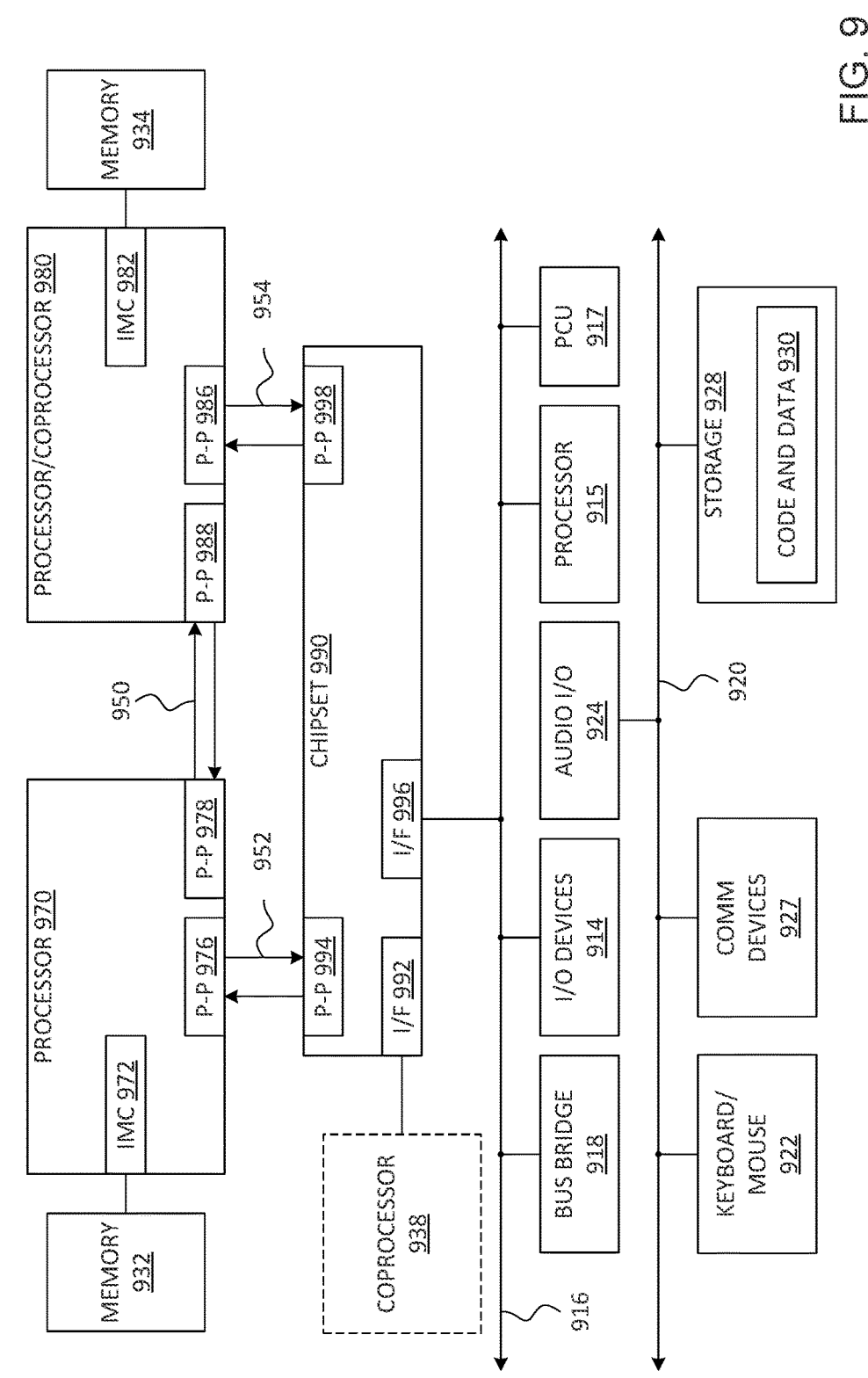
FIG. 9 illustrates an exemplary system.

FIG. 9 illustrates an exemplary system. Multiprocessor system 900 is a point-to-point interconnect system and includes a plurality of processors including a first processor 970 and a second processor 980 coupled via a point-to-point interconnect 950. In some examples, the first processor 970 and the second processor 980 are homogeneous. In some examples, first processor 970 and the second processor 980 are heterogenous. Though the exemplary system 900 is shown to have two processors, the system may have three or more processors, or may be a single processor system.

Processors 970 and 980 are shown including integrated memory controller (IMC) circuitry 972 and 982, respectively. Processor 970 also includes as part of its interconnect controller point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a coprocessor 938 via an interface 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some examples, first interconnect 916 may be a Peripheral Component Interconnect (PCI) interconnect, or an interconnect such as a PCI Express interconnect or another I/O interconnect. In some examples, one of the interconnects couples to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interconnect 916, along with a bus bridge 918 which couples first interconnect 916 to a second interconnect 920. In some examples, one or more additional processor(s) 915, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 916. In some examples, second interconnect 920 may be a low pin count (LPC) interconnect. Various devices may be coupled to second interconnect 920 including, for example, a keyboard and/or mouse 922, communication devices 927 and a storage circuitry 928. Storage circuitry 928 may be one or more non-transitory machine-readable storage media as described below, such as a disk drive or other mass storage device which may include instructions/code and data 930 in some examples. Further, an audio I/O 924 may be coupled to second interconnect 920. Note that other architectures than the point-to-point architecture described above are possible. For example, instead of the point-to-point architecture, a system such as a multiprocessor system 900 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 10 illustrates a block diagram of an example processor 1000 that may have more than one core and an integrated memory controller. The solid lined boxes illustrate a processor 1000 with a single core 1002A, a system agent unit circuitry 1010, a set of one or more interconnect controller unit(s) circuitry 1016, while the optional addition of the dashed lined boxes illustrates an alternative processor 1000 with multiple cores 1002A-N, a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004A-N within the cores 1002A-N, a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples ring-based interconnect network circuitry 1012 interconnects the special purpose logic 1008 (e.g., integrated graphics logic), the set of shared cache unit(s) circuitry 1006, and the system agent unit circuitry 1010, alternative examples use any number of well-known techniques for interconnecting such units. In some examples, coherency is maintained between one or more of the shared cache unit(s) circuitry 1006 and cores 1002A-N.

In some examples, one or more of the cores 1002A-N are capable of multi-threading. The system agent unit circuitry 1010 includes those components coordinating and operating cores 1002A-N. The system agent unit circuitry 1010 may include, for example, power control unit (PCU) circuitry and/or display unit circuitry (not shown). The PCU may be or may include logic and components needed for regulating the power state of the cores 1002A-N and/or the special purpose logic 1008 (e.g., integrated graphics logic). The display unit circuitry is for driving one or more externally connected displays.

The cores 1002A-N may be homogenous in terms of instruction set architecture (ISA). Alternatively, the cores 1002A-N may be heterogeneous in terms of ISA; that is, a subset of the cores 1002A-N may be capable of executing an ISA, while other cores may be capable of executing only a subset of that ISA or another ISA.

Exemplary Core Architectures—in-Order and Out-of-Order Core Block Diagram

FIG. 11A is a block diagram illustrating both an exemplary in-order pipeline and an exemplary register renaming, out-of-order issue/execution pipeline according to examples. FIG. 11B is a block diagram illustrating both an exemplary example of an in-order architecture core and an exemplary register renaming, out-of-order issue/execution architecture core to be included in a processor according to examples. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, and during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/ memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 11B may implement the pipeline 1100 as follows: 1) the instruction fetch circuitry 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11B shows a processor core 1190 including front-end unit circuitry 1130 coupled to an execution engine unit circuitry 1150, and both are coupled to a memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit circuitry 1130 may include branch prediction circuitry 1132 coupled to an instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front end circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, write-mask registers unit circuitry, and scalar register unit circuitry. These register units may provide architectural vector registers, vector mask registers, general-purpose registers, etc. The physical register file(s) circuitry 1158 is coupled to the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to a data cache circuitry 1174 coupled to a level 2 (L2) cache circuitry 1176. In one exemplary example, the memory access circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to the level 2 (L2) cache circuitry 1176 in the memory unit circuitry 1170. In one example, the instruction cache 1134 and the data cache 1174 are combined into a single instruction and data cache (not shown) in L2 cache circuitry 1176, a level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Exemplary Execution Unit(s) Circuitry

Figure 12:
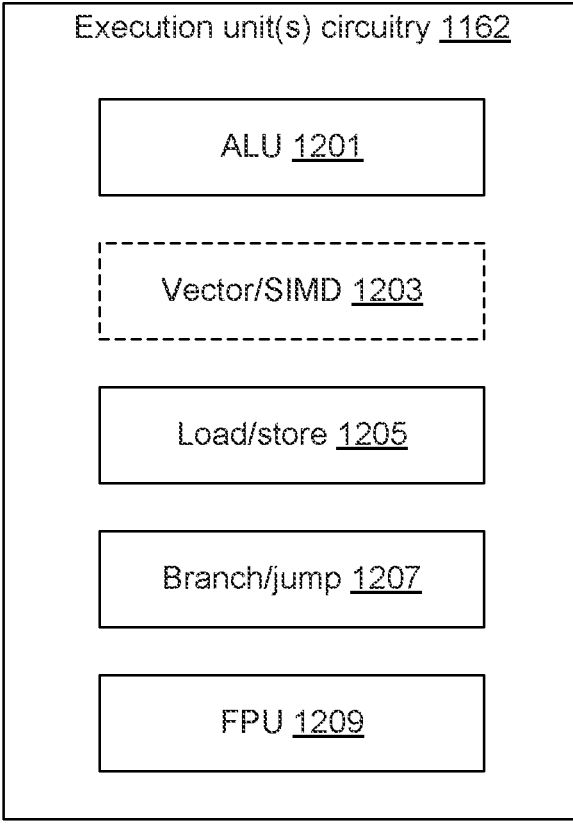
FIG. 12 illustrates examples of execution unit(s) circuitry.

FIG. 12 illustrates examples of execution unit(s) circuitry, such as execution unit(s) circuitry 1162 of FIG. 11B. As illustrated, execution unit(s) circuity 1162 may include one or more ALU circuits 1201, optional vector/single instruction multiple data (SIMD) circuits 1203, load/store circuits 1205, branch/jump circuits 1207, and/or Floating-point unit (FPU) circuits 1209. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. FPU circuits 1209 perform floating-point arithmetic. The width of the execution unit(s) circuitry 1162 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 13:
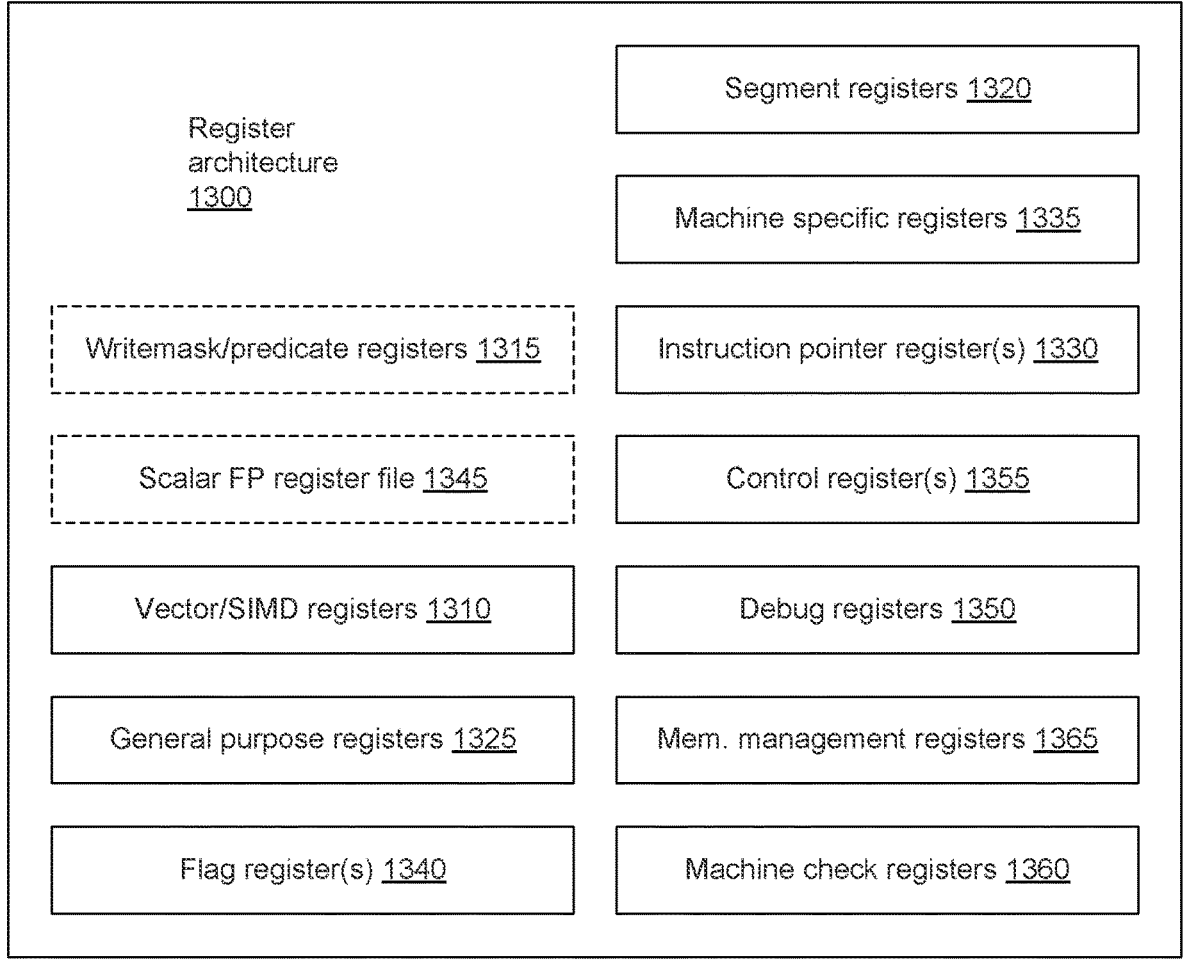
FIG. 13 is a block diagram of a register architecture according to some examples.

FIG. 13 is a block diagram of a register architecture 1300 according to some examples. As illustrated, the register architecture 1300 includes vector/SIMD registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory (mem) management registers 1365 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1300 may, for example, be used in physical register file(s) circuitry 1158.

In one or more first embodiments, a processor core comprises multiple caches comprising a first cache and a second cache, wherein the first cache is coupled to receive micro-operations from an instruction decoder, and wherein the second cache is coupled to receive data, or to receive instructions to be provided to the instruction decoder, first circuitry to monitor a performance of the multiple caches, second circuitry coupled to the first circuitry, the second circuitry to detect, based on the performance, an instance of a cache utilization condition wherein a utilization metric is above a threshold level, and third circuitry coupled to the second circuitry, wherein, based on the cache utilization condition, the third circuitry is to add the second cache to a pool of one or more caches which are to be available to receive micro-operations.

In one or more second embodiments, further to the first embodiment, while the second cache is in the pool, the third circuitry is further to store a first one or more micro-operations to the second cache.

In one or more third embodiments, further to the first embodiment or the second embodiment, the cache utilization condition is a first cache utilization condition, the threshold level is a first threshold level, the second circuitry is further to detect, based on the performance, an instance of a second cache utilization condition wherein the utilization metric is below a second threshold level, and the third circuitry is further to remove the second cache from the pool based on the second cache utilization condition.

In one or more fourth embodiments, further to the third embodiment, the first circuitry is further to maintain a table comprising entries which each correspond to a different respective instruction, wherein, for each of the entries, a respective one or more micro-operations were previously provided to the pool, a first count of a number of hits on the table, and a second count of a number of misses on the first cache, wherein the third circuitry is to remove the second cache from the pool based on both the first count and the second count.

In one or more fifth embodiments, further to the third embodiment, the second circuitry is further to determine a rate of misses on a first one or more caches comprising the second cache, the rate to be determined while the pool comprises the first cache and the first one or more caches, and wherein the second circuitry to detect the instance of the second cache utilization condition comprises the second circuitry to detect that the rate of misses on the first one or more caches is above a threshold rate.

In one or more sixth embodiments, further to any of the first through third embodiments, the third circuitry is further to move a second one or more micro-operations between the first cache and the second cache while the second cache is in the pool.

In one or more seventh embodiments, further to the sixth embodiment, the third circuitry is to move the second one or more micro-operations from the second cache to the first cache based on a hit on the second one or more micro-operations at the second cache.

In one or more eighth embodiments, further to any of the first through third embodiments, the third circuitry is further to signal the instruction decoder to send a second one or more micro-operations to the second cache while the second cache is in the pool.

In one or more ninth embodiments, further to any of the first through third embodiments, the third circuitry is further to detect that a first instruction comprises a first value which indicates whether the pool is to include more than one cache, wherein, the third circuitry is further to perform one of based on the first value add the second cache to the pool, and select one of the first cache or the second cache to receive a first one or more micro-operations which are generated by an instruction decoder based on the first instruction, or based on the first value remove the second cache from the pool, and provide the first one or more micro-operations to the first cache.

In one or more tenth embodiments, further to the ninth embodiment, the first value indicates that the pool is to include more than one cache, the third circuitry is further to detect that the first instruction further comprises a second value which specifies that the first cache is to receive the first one or more micro-operations, and the third circuitry to select the one of the first cache or the second cache comprises the third circuitry is to select the first cache based on the second value.

In one or more eleventh embodiments, a method at a processor comprises monitoring a performance of multiple caches of the processor, the multiple caches comprising a first cache and a second cache, wherein the first cache is coupled to receive micro-operations from an instruction decoder, and wherein the second cache is coupled to receive data, or to receive instructions to be provided to the instruction decoder, detecting, based on the performance, an instance of a cache utilization condition wherein a utilization metric is above a threshold level, and based on the cache utilization condition, adding the second cache to a pool of one or more caches which are to be available to receive micro-operations.

In one or more twelfth embodiments, further to the eleventh embodiment, the method further comprises while the second cache is in the pool, storing a first one or more micro-operations to the second cache.

In one or more thirteenth embodiments, further to the eleventh embodiment or the twelfth embodiment, the cache utilization condition is a first cache utilization condition, the threshold level is a first threshold level, the method further comprises detecting, based on the performance, an instance of a second cache utilization condition wherein the utilization metric is below a second threshold level, and based on the second cache utilization condition, removing the second cache from the pool.

In one or more fourteenth embodiments, further to the thirteenth embodiment, the method further comprises maintaining a table comprising entries which each correspond to a different respective instruction, wherein, for each of the entries, a respective one or more micro-operations were previously provided to the pool, maintaining a first count of a number of hits on the table, and maintaining a second count of a number of misses on the first cache, wherein the second cache is removed from the pool based on both the first count and the second count.

In one or more fifteenth embodiments, further to the thirteenth embodiment, the method further comprises determining a rate of misses on a first one or more caches comprising the second cache, the determining while the pool comprises the first cache and the first one or more caches, wherein detecting the instance of the second cache utilization condition comprises detecting that the rate of misses on the first one or more caches is above a threshold rate.

In one or more sixteenth embodiments, further to any of the eleventh through thirteenth embodiments, the method further comprises while the second cache is in the pool, moving a second one or more micro-operations between the first cache and the second cache.

In one or more seventeenth embodiments, further to the eleventh through thirteenth embodiment, the second one or more micro-operations are moved from the second cache to the first cache based on a hit on the second one or more micro-operations at the second cache.

In one or more eighteenth embodiments, further to any of the eleventh through thirteenth embodiments, the method further comprises, while the second cache is in the pool, sending a second one or more micro-operations from the instruction decoder to the second cache.

In one or more nineteenth embodiments, further to any of the eleventh through thirteenth embodiments, the method further comprises detecting that a first instruction comprises a first value which indicates whether the pool is to include more than one cache, and performing one of based on the first value adding the second cache to the pool, and selecting one of the first cache or the second cache to receive a first one or more micro-operations which are generated by an instruction decoder based on the first instruction, or based on the first value removing the second cache from the pool, and providing the first one or more micro-operations to the first cache.

In one or more twentieth embodiments, further to the nineteenth embodiment, the first value indicates that the pool is to include more than one cache, wherein the method further comprises detecting that the first instruction further comprises a second value which specifies that the first cache is to receive the first one or more micro-operations, and selecting the one of the first cache or the second cache comprises selecting the first cache based on the second value.

In one or more twenty-first embodiments, a system comprises a memory, a processor coupled to the memory, wherein a core of the processor comprises multiple caches comprising a first cache and a second cache, wherein the first cache is coupled to receive micro-operations from an instruction decoder, and wherein the second cache is coupled to receive data, or to receive instructions to be provided to the instruction decoder, first circuitry to monitor a performance of the multiple caches, second circuitry coupled to the first circuitry, the second circuitry to detect, based on the performance, an instance of a cache utilization condition wherein a utilization metric is above a threshold level, and third circuitry coupled to the second circuitry, wherein, based on the cache utilization condition, the third circuitry is to add the second cache to a pool of one or more caches which are to be available to receive micro-operations, and a display device coupled to the processor and the memory, the display device to display an image based on an execution of a program with the processor core.

In one or more twenty-second embodiments, further to the twenty-first embodiment, while the second cache is in the pool, the third circuitry is further to store a first one or more micro-operations to the second cache.

In one or more twenty-third embodiments, further to the twenty-first embodiment or the twenty-second embodiment, the cache utilization condition is a first cache utilization condition, the threshold level is a first threshold level, the second circuitry is further to detect, based on the performance, an instance of a second cache utilization condition wherein the utilization metric is below a second threshold level, and the third circuitry is further to remove the second cache from the pool based on the second cache utilization condition.

In one or more twenty-fourth embodiments, further to the twenty-third embodiment, the first circuitry is further to maintain a table comprising entries which each correspond to a different respective instruction, wherein, for each of the entries, a respective one or more micro-operations were previously provided to the pool, a first count of a number of hits on the table, and a second count of a number of misses on the first cache, wherein the third circuitry is to remove the second cache from the pool based on both the first count and the second count.

In one or more twenty-fifth embodiments, further to the twenty-third embodiment, the second circuitry is further to determine a rate of misses on a first one or more caches comprising the second cache, the rate to be determined while the pool comprises the first cache and the first one or more caches, and wherein the second circuitry to detect the instance of the second cache utilization condition comprises the second circuitry to detect that the rate of misses on the first one or more caches is above a threshold rate.

In one or more twenty-sixth embodiments, further to any of the twenty-first through twenty-third embodiments, the third circuitry is further to move a second one or more micro-operations between the first cache and the second cache while the second cache is in the pool.

In one or more twenty-seventh embodiments, further to the twenty-sixth embodiment, the third circuitry is to move the second one or more micro-operations from the second cache to the first cache based on a hit on the second one or more micro-operations at the second cache.

In one or more twenty-eighth embodiments, further to any of the twenty-first through twenty-third embodiments, the third circuitry is further to signal the instruction decoder to send a second one or more micro-operations to the second cache while the second cache is in the pool.

In one or more twenty-ninth embodiments, further to any of the twenty-first through twenty-third embodiments, the third circuitry is further to detect that a first instruction comprises a first value which indicates whether the pool is to include more than one cache, and wherein, the third circuitry is further to perform one of based on the first value add the second cache to the pool, and select one of the first cache or the second cache to receive a first one or more micro-operations which are generated by an instruction decoder based on the first instruction, or based on the first value remove the second cache from the pool, and provide the first one or more micro-operations to the first cache.

In one or more thirtieth embodiments, further to the twenty-ninth embodiment, the first value indicates that the pool is to include more than one cache, the third circuitry is further to detect that the first instruction further comprises a second value which specifies that the first cache is to receive the first one or more micro-operations, and the third circuitry to select the one of the first cache or the second cache comprises the third circuitry is to select the first cache based on the second value.

The description herein includes numerous details which are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for caching decoded instruction information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor core comprising:
   multiple caches comprising a first cache and a second cache, wherein the first cache is coupled to receive micro-operations from an instruction decoder, and wherein the second cache is coupled to receive instructions to be provided to the instruction decoder;

first circuitry to monitor a performance of the multiple caches;

second circuitry coupled to the first circuitry, the second circuitry to detect, based on the performance, an instance of a first cache utilization condition wherein a utilization metric is above a first threshold level; and third circuitry coupled to the second circuitry, wherein, based on the first cache utilization condition, the third circuitry is to add the second cache to a pool of one or more caches which are to be available to receive micro-operations;

wherein:

the first circuitry is further to maintain:

a table comprising entries which each correspond to a different respective instruction, wherein, for each of the entries, a respective one or more micro-operations were previously provided to the pool;

a first count of a number of hits on the table; and a second count of a number of misses on the first cache;

the second circuitry is further to:

determine a rate of misses on a first one or more caches comprising the second cache, the rate to be determined while the pool comprises the first cache and the first one or more caches; and detect, based on the performance, an instance of a second cache utilization condition wherein the utilization metric is below a second threshold level, comprising the second circuitry to detect that the rate of misses on the first one or more caches is above a threshold rate; and the third circuitry is further to remove the second cache from the pool based on the second cache utilization condition, comprising the third circuitry to remove the second cache from the pool based on both the first count and the second count.

2. The processor core of claim 1, wherein, while the second cache is in the pool, the third circuitry is further to store a first one or more micro-operations to the second cache.

3. The processor core of claim 1, wherein the second circuitry is further to determine a rate of misses on a first one or more caches comprising the second cache, the rate to be determined while the pool comprises the first cache and the first one or more caches; and wherein the second circuitry to detect the instance of the second cache utilization condition comprises the second circuitry to detect that the rate of misses on the first one or more caches is above a threshold rate.

4. The processor core of claim 1, wherein the third circuitry is further to move a second one or more micro-operations between the first cache and the second cache while the second cache is in the pool.

5. The processor core of claim 4, wherein the third circuitry is to move the second one or more micro-operations from the second cache to the first cache based on a hit on the second one or more micro-operations at the second cache.

6. The processor core of claim 1, wherein, the third circuitry is further to signal the instruction decoder to send a second one or more micro-operations to the second cache while the second cache is in the pool.

7. The processor core of claim 1, wherein the third circuitry is further to detect that a first instruction comprises a first value which indicates whether the pool is to include more than one cache; and wherein, the third circuitry is further to perform one of:

based on the first value:

add the second cache to the pool; and select one of the first cache or the second cache to receive a first one or more micro-operations which are generated by an instruction decoder based on the first instruction; or based on the first value:

remove the second cache from the pool; and provide the first one or more micro-operations to the first cache.

8. The processor core of claim 7, wherein:

the first value indicates that the pool is to include more than one cache;

the third circuitry is further to detect that the first instruction further comprises a second value which specifies that the first cache is to receive the first one or more micro-operations; and the third circuitry to select the one of the first cache or the second cache comprises the third circuitry is to select the first cache based on the second value.

9. A method at a processor, the method comprising:

monitoring a performance of multiple caches of the processor, the multiple caches comprising a first cache and a second cache, wherein the first cache is coupled to receive micro-operations from an instruction decoder, and wherein the second cache is coupled to receive instructions to be provided to the instruction decoder;

detecting, based on the performance, an instance of a first cache utilization condition wherein a utilization metric is above a first threshold level;

based on the first cache utilization condition, adding the second cache to a pool of one or more caches which are to be available to receive micro-operations;

maintaining a table comprising entries which each correspond to a different respective instruction, wherein, for each of the entries, a respective one or more micro-operations were previously provided to the pool;

maintaining a first count of a number of hits on the table;

maintaining a second count of a number of misses on the first cache;

detecting, based on the performance, an instance of a second cache utilization condition wherein the utilization metric is below a second threshold level; and based on the second cache utilization condition, removing the second cache from the pool, wherein the second cache is removed from the pool based on both the first count and the second count.

10. The method of claim 9, further comprising determining a rate of misses on a first one or more caches comprising the second cache, the determining while the pool comprises the first cache and the first one or more caches;

wherein detecting the instance of the second cache utilization condition comprises detecting that the rate of misses on the first one or more caches is above a threshold rate.

11. The method of claim 9, further comprising:

while the second cache is in the pool, moving a second one or more micro-operations between the first cache and the second cache.

12. The method of claim 9, further comprising:

detecting that a first instruction comprises a first value which indicates whether the pool is to include more than one cache; and performing one of:

based on the first value:

adding the second cache to the pool; and selecting one of the first cache or the second cache to receive a first one or more micro-operations which are generated by an instruction decoder based on the first instruction; or based on the first value:

removing the second cache from the pool; and providing the first one or more micro-operations to the first cache.

13. A system comprising:

a memory;

a processor coupled to the memory, wherein a core of the processor comprises:

multiple caches comprising a first cache and a second cache, wherein the first cache is coupled to receive micro-operations from an instruction decoder, and wherein the second cache is coupled to receive instructions to be provided to the instruction decoder;

first circuitry to monitor a performance of the multiple caches of the processor;

second circuitry coupled to the first circuitry, the second circuitry to detect, based on the performance, an instance of a first cache utilization condition wherein a utilization metric is above a first threshold level; and third circuitry coupled to the second circuitry, wherein, based on the first cache utilization condition, the third circuitry is to add the second cache to a pool of one or more caches which are to be available to receive micro-operations;

wherein:

the first circuitry is further to maintain:

a table comprising entries which each correspond to a different respective instruction, wherein, for each of the entries, a respective one or more micro-operations were previously provided to the pool;

a first count of a number of hits on the table; and a second count of a number of misses on the first cache;

the second circuitry is further to:

determine a rate of misses on a first one or more caches comprising the second cache, the rate to be determined while the pool comprises the first cache and the first one or more caches; and detect, based on the performance, an instance of a second cache utilization condition wherein the utilization metric is below a second threshold level, comprising the second circuitry to detect that the rate of misses on the first one or more caches is above a threshold rate; and the third circuitry is further to remove the second cache from the pool based on the second cache utilization condition, comprising the third circuitry to remove the second cache from the pool based on both the first count and the second count; and a display device coupled to the processor and the memory, the display device to display an image based on an execution of a program with the core.

14. The system of claim 13, wherein the third circuitry is further to detect that a first instruction comprises a first value which indicates whether the pool is to include more than one cache; and wherein, the third circuitry is further to perform one of:

based on the first value:

add the second cache to the pool; and select one of the first cache or the second cache to receive a first one or more micro-operations which are generated by an instruction decoder based on the first instruction; or based on the first value:

remove the second cache from the pool; and provide the first one or more micro-operations to the first cache.

* * * * *